(12) United States Patent
Choi et al.

(10) Patent No.: US 9,961,531 B2
(45) Date of Patent: May 1, 2018

(54) METHOD AND DEVICE FOR CONTROLLING DEVICE USING BLUETOOTH IN WIRELESS COMMUNICATION SYSTEM

(71) Applicant: LG ELECTRONICS INC., Seoul (KR)

(72) Inventors: Jingu Choi, Seoul (KR); Younghwan Kwon, Seoul (KR); Hyunsik Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/282,747

(22) Filed: Sep. 30, 2016

(65) Prior Publication Data

US 2017/0099597 A1    Apr. 6, 2017

Related U.S. Application Data

(60) Provisional application No. 62/236,161, filed on Oct. 2, 2015.

(51) Int. Cl.
*H04B 7/00* (2006.01)
*H04W 8/00* (2009.01)

(52) U.S. Cl.
CPC .................................. *H04W 8/005* (2013.01)

(58) Field of Classification Search
CPC ..... H04W 4/008; H04W 12/06; H04W 12/08; H04W 76/023
USPC ................................ 455/41.1–41.3, 410, 411
See application file for complete search history.

(56) References Cited

U.S. PATENT DOCUMENTS

| 7,216,231 | B2 * | 5/2007 | Gehrmann | H04L 63/062 |
| | | | | 380/270 |
| 7,831,828 | B2 * | 11/2010 | Von Arx | A61B 5/0031 |
| | | | | 607/31 |
| 9,160,424 | B2 * | 10/2015 | Kim | H04B 5/0062 |
| 9,473,233 | B2 * | 10/2016 | Xie | H04B 7/155 |
| 9,504,388 | B2 * | 11/2016 | Baker | A61B 5/0002 |
| 2005/0204134 | A1 * | 9/2005 | Von Arx | A61B 5/0031 |
| | | | | 713/168 |
| 2006/0135065 | A1 * | 6/2006 | Lee | H04W 12/04 |
| | | | | 455/41.1 |
| 2012/0083208 | A1 * | 4/2012 | Giles | G06F 13/387 |
| | | | | 455/41.2 |

(Continued)

*Primary Examiner* — Nguyen Vo
*Assistant Examiner* — Rui Hu
(74) *Attorney, Agent, or Firm* — Lee Hong Degerman Kang Waimey

(57) ABSTRACT

The present invention relates to a method for controlling a first device performed by a control device using the Bluetooth. The present invention provides a method and apparatus including receiving a first advertising message from a first device; calculating a first distance value that indicates a distance with the first device based on the first advertising message; receiving a second advertising message from a second device when the first distance value is smaller than a threshold value preconfigured to determine a proximity with the control device; and calculating a second distance value that indicates a distance with the second device based on the second advertising message, where a Bluetooth connection is established between the first device and the second device when the second distance value is smaller than the threshold value.

4 Claims, 22 Drawing Sheets

(56) References Cited

U.S. PATENT DOCUMENTS

| | | | | |
|---|---|---|---|---|
| 2014/0097934 A1* | 4/2014 | Su | ............ | G08C 17/00 |
| | | | | 340/3.1 |
| 2015/0065053 A1* | 3/2015 | Cho | ............ | H04W 4/008 |
| | | | | 455/41.2 |
| 2015/0147970 A1* | 5/2015 | Tan | ............ | H04W 12/08 |
| | | | | 455/41.2 |
| 2015/0334554 A1* | 11/2015 | Song | ............ | H04W 8/205 |
| | | | | 455/558 |
| 2015/0347114 A1* | 12/2015 | Yoon | ............ | G06F 8/61 |
| | | | | 235/375 |
| 2015/0372746 A1* | 12/2015 | Xie | ............ | H04B 7/155 |
| | | | | 455/11.1 |
| 2016/0037573 A1* | 2/2016 | Ko | ............ | H04L 63/0876 |
| | | | | 455/41.2 |
| 2016/0094700 A1* | 3/2016 | Lee | ............ | H04W 8/245 |
| | | | | 455/419 |
| 2016/0100303 A1* | 4/2016 | Kim | ............ | H04W 76/02 |
| | | | | 455/426.1 |
| 2016/0112202 A1* | 4/2016 | Vandervort | ............ | H04L 9/3247 |
| | | | | 713/176 |
| 2016/0128114 A1* | 5/2016 | Moy | ............ | H04W 8/005 |
| | | | | 455/434 |
| 2016/0150358 A1* | 5/2016 | Ko | ............ | H04W 4/008 |
| | | | | 455/41.1 |
| 2016/0381553 A1* | 12/2016 | Lee | ............ | H04W 4/001 |
| | | | | 455/411 |
| 2017/0026818 A1* | 1/2017 | Beaulieu | ............ | A01D 34/008 |
| 2017/0055150 A1* | 2/2017 | Hou | ............ | H04W 4/008 |
| 2017/0091412 A1* | 3/2017 | Johnson | ............ | G06F 19/36 |
| 2017/0118789 A1* | 4/2017 | Lee | ............ | H04W 76/025 |

* cited by examiner (a) BR/EDR Protocol Stack (b) LE Protocol Stack

Fig.11

| Preamble (1byte) | Access Address (4byte) | PDU (2 to 39byte) | CRC (3byte) |

| AD Type | AD Data |

(a) Link Layer packet format

| AD Type | AD Data |
|---|---|
|《Advertising Interval》 | 100ms |
| 《Service Information》 | Audio, Stored Contents, ⋯ |
| 《Tx Power》 | −10dBm |

(b) Example of Advertising Message (Parameters)

METHOD AND DEVICE FOR CONTROLLING DEVICE USING BLUETOOTH IN WIRELESS COMMUNICATION SYSTEM

CROSS-REFERENCE TO RELATED APPLICATIONS

Pursuant to 35 U.S.C. § 119(e), this application claims benefit of U.S. Provisional Patent Application No. 62/236,161, filed on Oct. 2, 2015, the contents of which are all hereby incorporated reference herein in their entirety.

BACKGROUND OF THE INVENTION

Field of the Invention

The present invention relates to a method and apparatus for transmitting and receiving data between devices using Bluetooth, a near-field communication (NFC) technology, in a wireless communication system, and more particularly, to a method and apparatus for transmitting and receiving data between devices using a Bluetooth basic rate/enhanced data rate (BR/EDR) or Bluetooth low energy (BLE) technology.

Discussion of the Related Art

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

An object of the present invention is to provide a method and apparatus for controlling a device using the Bluetooth technique.

In addition, another object of the present invention is to provide a method and apparatus for controlling two adjacent devices using the Bluetooth technique in the case that two adjacent devices come close to a control device within a predetermined time.

In addition, still another object of the present invention is to provide a method and apparatus for authorizing to communicate or to control by recognizing or identifying a user between devices using the Bluetooth technique.

In addition, still another object of the present invention is to provide a method and apparatus for authorizing an Authority Manager to control neighboring devices, withdrawing or changing the authority using the Bluetooth technique.

The technical objects to attain in the present invention are not limited to the above-described technical objects and other technical objects which are not described herein will become apparent to those skilled in the art from the following description.

In order to solve the problem, the present invention provides a method for a first device to control a second device using the Bluetooth technique.

Particularly, according to an aspect of the present invention, a method for connecting a first device and a second device performed by a control device using a Bluetooth communication includes receiving a first advertising message from a first device; calculating a first distance value that indicates a distance with the first device based on the first advertising message; receiving a second advertising message from a second device when the first distance value is smaller than a threshold value preconfigured to determine a proximity with the control device; and calculating a second distance value that indicates a distance with the second device based on the second advertising message, where a Bluetooth connection is established between the first device and the second device when the second distance value is smaller than the threshold value.

In addition, in the present invention, the first advertising message and the second advertising message include a parameter for identifying transmission power (Tx power) information or proximity information.

In addition, in the present invention, the second advertising message is received within a specific time after calculating the first distance value.

In addition, in the present invention, the first distance value is calculated based on a plurality of the first advertising message, and the second distance value is calculated based on a plurality of the second advertising message.

In addition, according to another aspect of the present invention, a method for controlling a second device performed by a control device using a Bluetooth communication includes establishing a Bluetooth connection with a first device; receiving a first token generated from first user information that indicates a first user from the first device; establishing a Bluetooth connection with a second device; exchanging the first token and a second token stored in the second device with the second device, where the second token is generated from second user information that indicates a second user registered in the second device; and controlling the second device when the first user and the second user are identical by comparing the first token and the second token.

In addition, in the present invention, controlling the second device further includes configuring a control range of the second device based on the first token value.

In addition, in the present invention, the first token is transmitted from the first device when a first distance value that indicates a distance between the first device and the control device is smaller than a threshold value preconfigured in the first device, and the threshold value is a value for determining a proximity with the first device.

In addition, in the present invention, controlling the second device controls the second device when a second distance value that indicates a distance between the second device and the first device is smaller than the threshold value.

In addition, in the present invention, the first distance value and the second distance value are periodically calculated by the first device.

In addition, according to still another aspect of the present invention, a control device for controlling a second device using a Bluetooth communication includes a communication unit for communicating to an exterior; and a processor functionally connected to the communication unit, wherein the processor is configured to: establishing a Bluetooth connection with a first device; receiving a first token generated from first user information that indicates a first user from the first device; establishing a Bluetooth connection with a second device; exchanging the first token and a second token stored in the second device with the second device, where the second token is generated from second user information that indicates a second user registered in the second device; and controlling the second device when the first user and the second user are identical by comparing the first token and the second token.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 11 is a view illustrating a parameter in a link layer packet format and an advertising message according to an embodiment of the present invention.

DETAILED DESCRIPTION OF THE INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
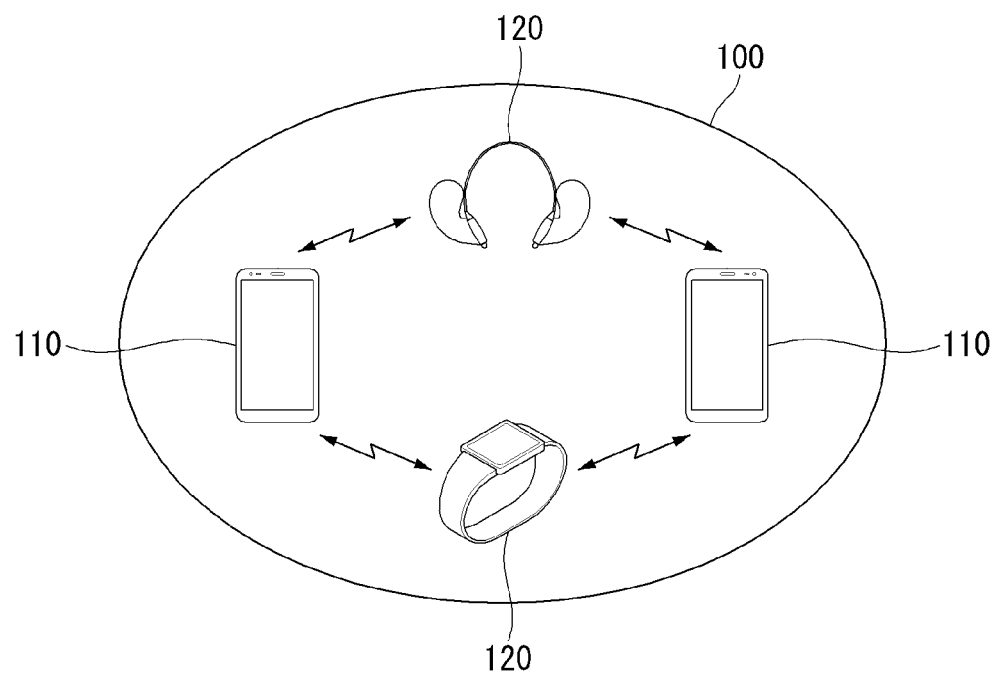
FIG. 1 is a schematic view illustrating an example of a wireless communication system that uses the Bluetooth low energy technique proposed in the present disclosure.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
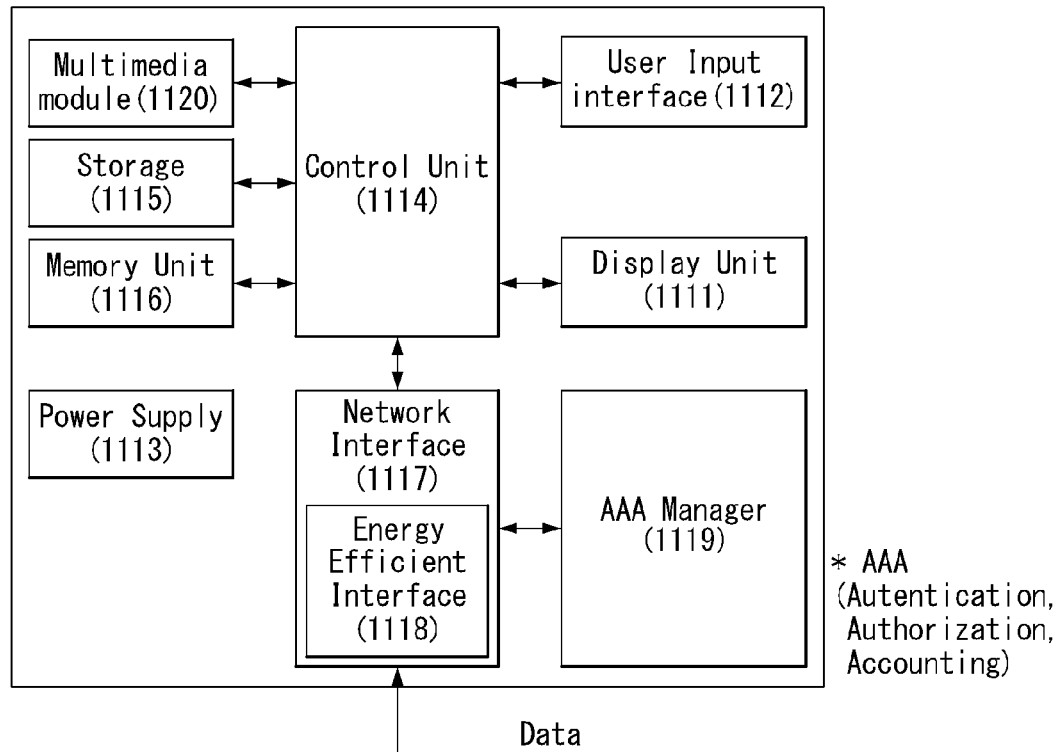
FIG. 2 is an example of an internal block diagram of a device in which the method proposed in the present disclosure is implementable.
Figure 2:
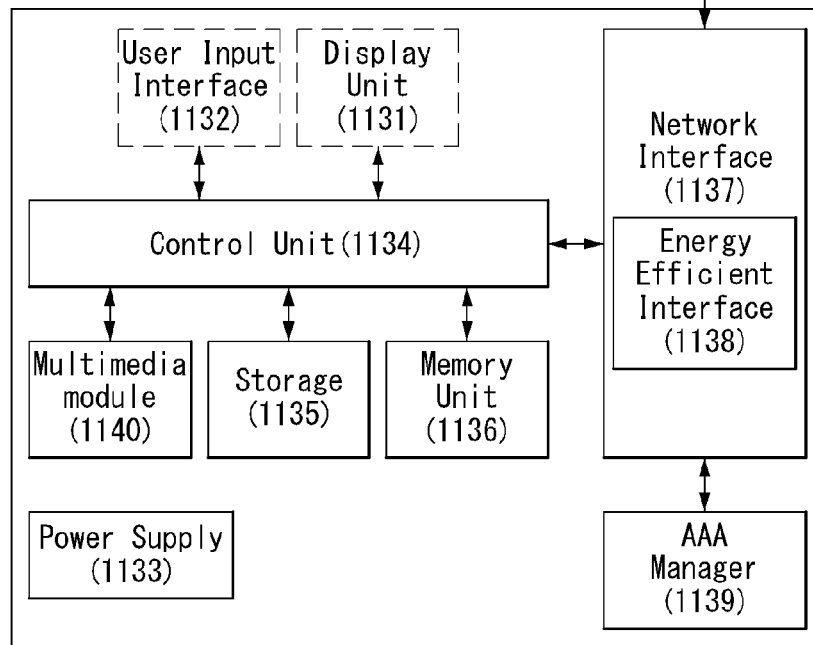

FIG. 2 is an example of an internal block diagram of a device which enables to implement the methods that are proposed in the present disclosure.

As shown in FIG. 2, a client device 1110 includes a display unit 1111, a user input interface 1112, a power supply unit 1113, a control unit 1114, a storage 1115, a memory unit 1116, a network interface 1117, an energy efficiency interface 1118, an authentication, authorization and accounting (AAA) manager 1119 and a multimedia module 1120.

The display unit 1111, the user input interface 1112, the power supply unit 1113, the control unit 1114, the storage 1115, the memory unit 1116, the network interface 1117, the energy efficiency interface 1118, the AAA manager 1119 and the multimedia module 1120 are functionally connected to perform the method proposed in the present disclosure.

In addition, a host device 1130 includes a display unit 1131, a user input interface 1132, a power supply unit 1133, a control unit 1134, a storage 1135, a memory unit 1136, a network interface 1137, an energy efficiency interface 1138, an AAA manager 1139 and a multimedia module 1140.

The display unit 1131, the user input interface 1132, the power supply unit 1133, the control unit 1134, the storage 1135, the memory unit 1136, the network interface 1137, the energy efficiency interface 1138, the AAA manager 1139 and the multimedia module 1140 are functionally connected to perform the method proposed in the present disclosure.

The network interfaces 1117 and 1137 refer to as the units (or modules) that are available to transmit a message or data for request/response, command, alarm, instruction/identification, and so on between devices using the Bluetooth technique.

The storages 1115 and 1135 or the memory units 1116 and 1136 refer to as the units that are implemented in various types of devices and various types of data are stored therein.

The control units 1114 and 1134 refer to as the units for controlling the whole operations of a wearable device or a host device, and control to request a transmission of a message using a Bluetooth interface and other communication interfaces and to process a received message.

The control units 1114 and 1134 may be expressed as a processor, a control unit, a controller, and so on.

The control units 1114 and 1134 may include a application-specific integrated circuit (ASIC), other chipset, a logical circuit and/or a data processing device.

The control units 1114 and 1134 control the communication unit in order to receive an Advertising message from a server device, to transmit a scan request message to the server device and to receive a scan response message in response to the scan request from the server device, and to transmit a connection request message to the server device for a Bluetooth connection configuration with the server device.

In addition, the control units 1114 and 1134 control the network interfaces 1117 and 1137 so as to read or write data using an attribute protocol from the server device after a Bluetooth LE connection is established through the connection procedure.

The storages 1115 and 1135 or the memory units 1116 and 1136 may include read-only memory (ROM), random access memory (RAM), flash memory, a memory card, storage medium and/or other storage devices.

The network interfaces 1117 and 1137 may include a baseband circuit for processing radio signals. When the embodiments are implemented as software, the above-mentioned technique may be implemented by a module (process, function, etc.) that performs the above-mentioned functions.

The storages 1115 and 1135 or the memory units 1116 and 1136 may be interior or exterior of the processors 114 and 124, and may be connected to the control units 1114 and 1134 with well-known means.

The display units 1111 and 1131 refer to as the modules for providing the information of the device state and the message exchange to a user through a screen.

The power supply unit 1113 and 1133 refer to as modules for supplying power source required for the operation of each element by receiving an external power source or an internal power source under the control of the control unit.

The energy efficient Interfaces 1118 and 1138 refer to as the units (or modules) that are available to transmit a message or data for request/response, command, alarm, instruction/identification, and so on between devices using the Bluetooth LE technique.

As described above, the BLE technique has a small duty cycle, and may decrease the power consumption significantly through the data transmission rate of low speed.

The user input interfaces 1112 and 1132 refer to as the modules that enable a user to control the operation of a device by providing a user input such as a screen button to the control unit.

The AAA managers 1119 and 1139 store the characteristics information required for the operation of authentication, authorization and accounting, and control the network interfaces 1117 and 1137 so as to read or write data using the attribute protocol from the host device.

An AAA profile and an AAA service define the information required for the operation of authentication, authorization and accounting. Particularly, the AAA profile means an operation between an AAA server and an AAA requester or client. The AAA server defined in the AAA profile stores the characteristics information defined in the AAA service.

The multimedia modules 1120 and 1140 perform the playback of various types of multimedia. The multimedia modules 1120 and 1140 may be implemented separately from the control units 1114 and 1134, or integrally implemented as a physical unit with the control units.

FIG. 2 shows the client device 1110 and the host device 1130, but the client device 1110 or the host device 1130 may be implemented as a control device, a controller device, a wearable device, an authority manager, and the like proposed in the present disclosure.

Figure 3:
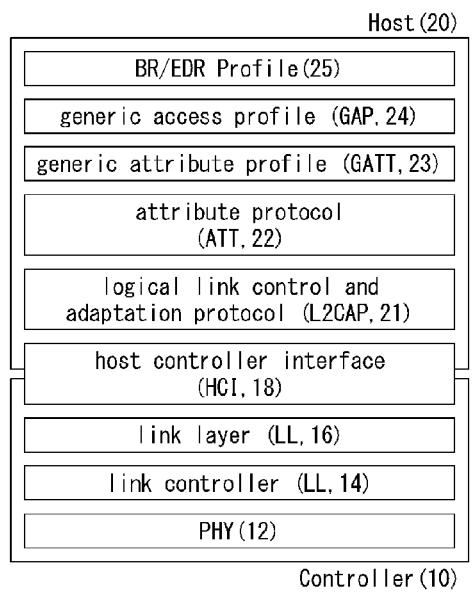
FIG. 3 is a view illustrating an example of a Bluetooth communication architecture to which the methods proposed in the present disclosure is implementable.
Figure 3:
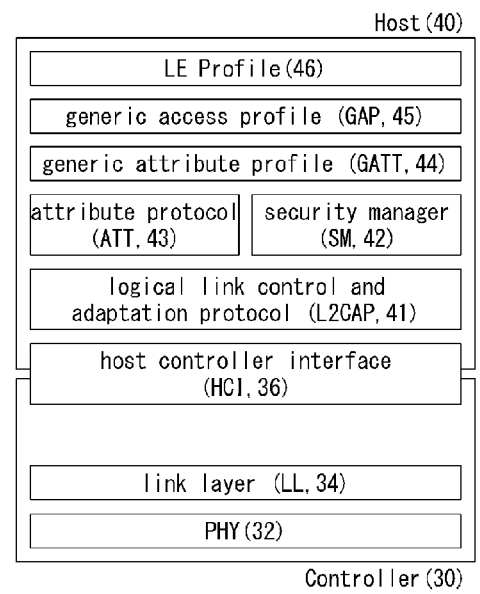

FIG. 3 is a view illustrating an example of a Bluetooth communication architecture to which the methods proposed in the present disclosure is implementable.

Referring to FIG. 3, FIG. 3A shows an example of a protocol stack of the Bluetooth BR (Basic Rate)/EDR (Enhanced Data Rate), and FIG. 3B shows an example of a protocol stack of the Bluetooth Low Energy (LE).

In detail, as illustrated in (a) of FIG. 3, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 10 may include a PHY layer 12, a Link Controller layer 14 and a Link Manager layer 16.

The PHY layer 12 is the layer of transmitting and receiving a radio signals of 2.4 GHz, and may transmit data by hopping 79 RF channels in the case of using the Gaussian Frequency Shift Keying (GFSK) modulation.

The Link Controller layer 14 plays the role of transmitting a Digital Signal, selects the channel sequence of hopping 1400 times per second, and transmits the time slot of 625 μs length for each channel.

The Link Manager layer 16 controls the entire operations (link setup, control and security) of a Bluetooth connection by utilizing the Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 3, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the logical link control and the adaptation protocol (L2CAP) 41, the Security Manager (SM) 42, the Attribute Protocol (ATT) 43, the Generic Attribute Profile (GATT) 44, the Generic Access Profile 45 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 4:
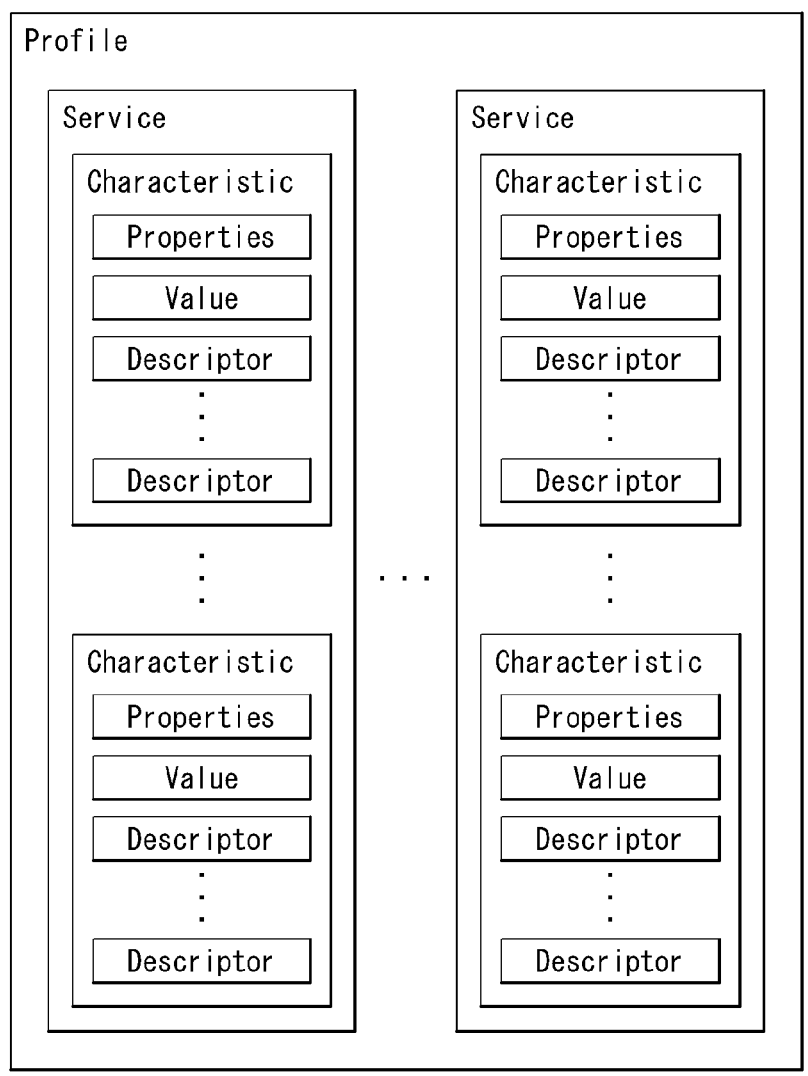
FIG. 4 is a view illustrating an example of a structure of Generic Attribute Profile (GATT Profile) of the Bluetooth low energy.

FIG. 4 is a view illustrating an example of a structure of GATT Profile of the Bluetooth low energy.

Referring to FIG. 4, the structure for exchange of Profile Data of the Bluetooth Low Energy is shown.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

Figure 5:
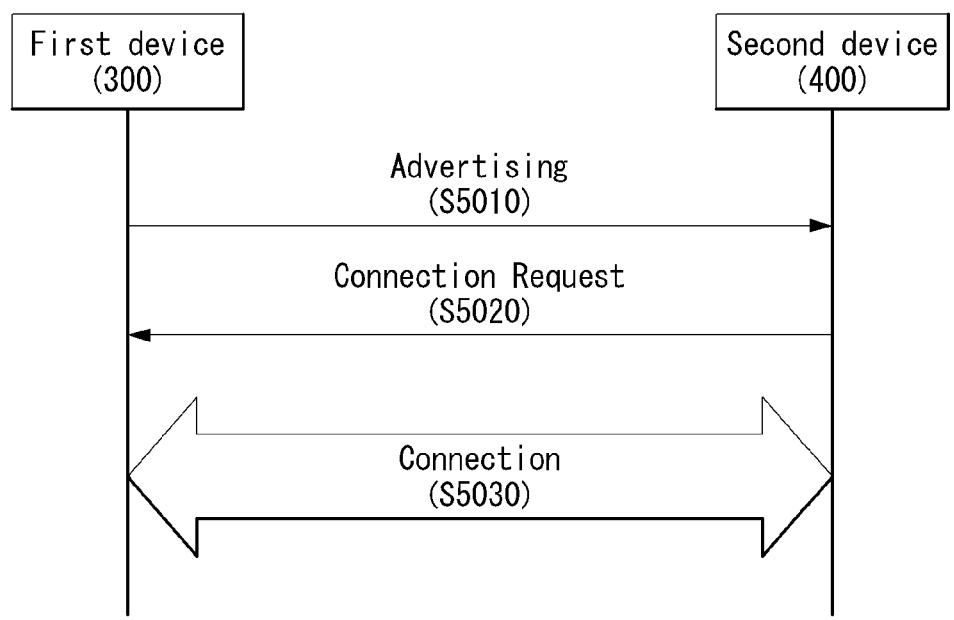
FIG. 5 is a flowchart illustrating a method for forming a connection between devices using the Bluetooth Low Energy (LE).

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.
- handle: Address of attribute
- Type: Type of attribute
- Value: Value of attribute
- Permission: Right to access attribute The present invention proposes a method for controlling a device by acquiring the association information and the information in relation to a controllable operation of a device which is to be controlled by a control device through the GATT.

FIG. 5 is a flowchart illustrating a method for forming a connection between devices using the Bluetooth Low Energy (LE).

As shown in FIG. 5, for the Bluetooth LE connection between a first device 300 and a second device 400, the first device 300 transmits an Advertising Message to the second device 400 (step, S5010).

In this case, the Advertising Message may be transmitted in the broadcast scheme or the unicast scheme.

As described above, the Advertising Message is used for providing the information of a device to another device by utilizing the Bluetooth LE, and may include various types of information such as the service information provided by the device, the user information, and so on.

The second device 400 may discover the first device 300 through the Advertising Message.

After identifying the information included in the Advertising Message, the second device 400 transmits a connection request message for connecting the Bluetooth LE connection to the first device 300 (step, S5020), and the first device 300 and the second device 400 establish a Bluetooth Low Energy (LE) connection (step, S5030).

Such a method has a disadvantage that a user is unable to control the connection establishment and it is impossible to check a PIN number and to control a connection configuration in case that a User Interface (UI) is not existed in the first device 300 and/or the second device 400.

Accordingly, in order to solve the problem, the present invention proposes a method for controlling the first device 300 and the second device 400 by using a third device.

Figure 6:
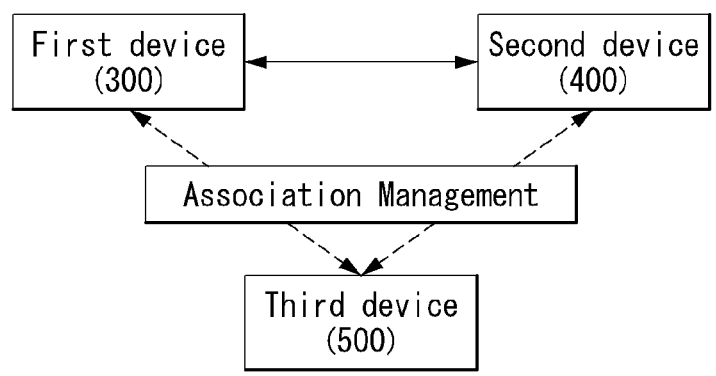
FIG. 6 is a view schematically illustrating a method for controlling another device through a control device proposed in the present disclosure.

FIG. 6 is a view schematically illustrating a method for controlling another device through a control device proposed in the present disclosure.

As shown in FIG. 6, a third device 500 is required to control the operation between the first device 300 and the second device 400, and the third device 500 requires a new control protocol in order to control the association of the first device 300 and the second device 400.

Hereinafter, the control device for controlling the operation of the first device 300 and the second device 400 is referred to as the third device 500.

In this case, in order to control the operation of the devices, the third device 500 should know the information (e.g., interface information, service information, etc.) of the devices.

A user authentication method for the user information exchange between a client device and a server device will be described below.

The user authentication method (or user authentication service) may be performed by three procedures as follows.
- Registration Session: a process of registering a client device at a server device
- Secure Session: a process of identifying whether a user is previously registered user and generating a secure session
- Secure Get/Put process: an operation of adding/deleting/updating a user token which is stored in a server device The Registration Session Characteristics is used for registering a user by a client device. Each user of the client device requires the registration session. A server device issues a registration ID to the client device through the registration session. Later, the entire token access and the authentication operation for the corresponding user are performed based on the registration ID.

When the registration ID is registered once, a server stores the registration ID which is registered in a non-volatile storage. The connection release or the reliability loss event between a client and a server generates a token which is not valid to the server, but the registration of the client is maintained. Owing to this, a user is not required to register again several times.

Figure 7:
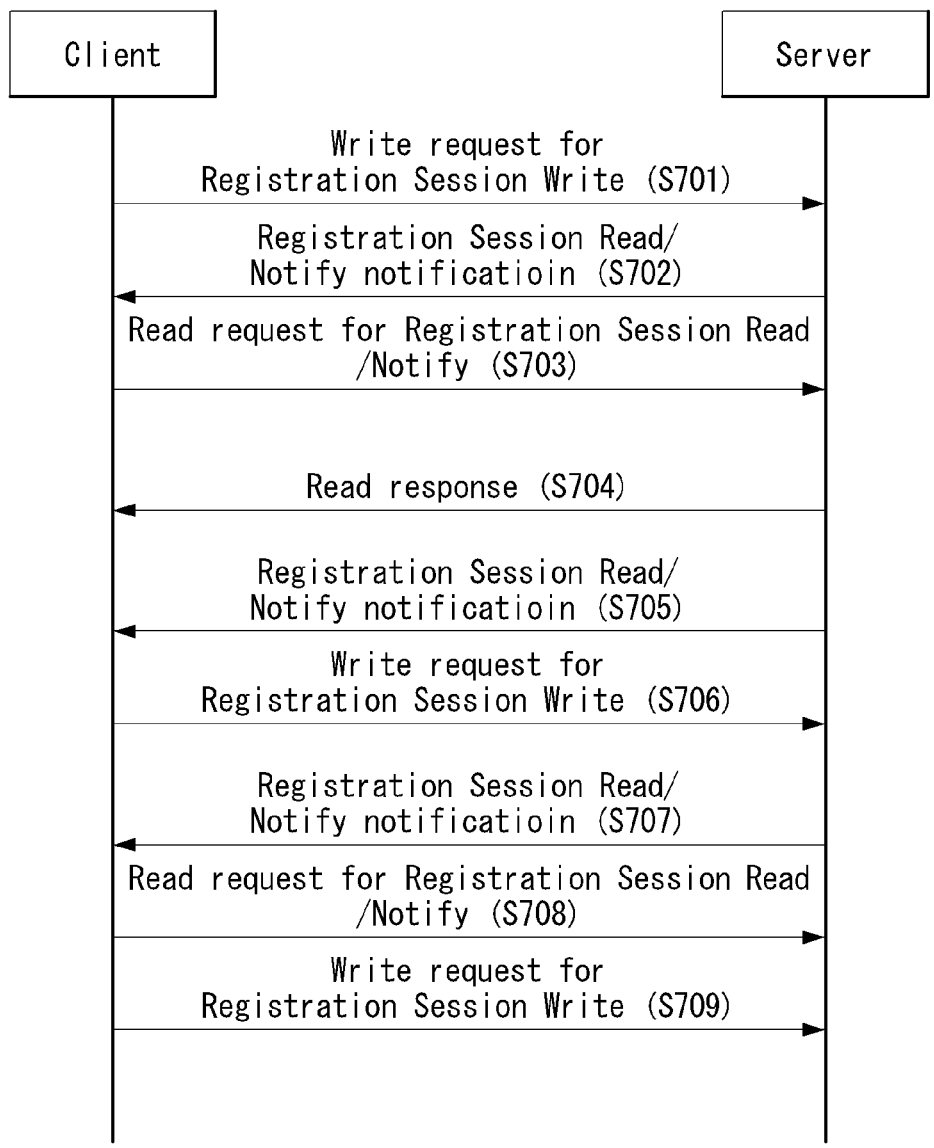
FIG. 7 is a flowchart illustrating a process of registering a client device at a server device to which the method proposed in the present disclosure is applicable.

FIG. 7 is a flowchart illustrating a process of registering a client device at a server device to which the method proposed in the present disclosure is applicable.

A client transmits a Write request for Registration Session Write message to a server (step, S701).

The Write request for Registration Session Write corresponds to a message for initializing the registration session, and may include a Registration Request Number or a Characteristics Value.

The server transmits a Registration Session Read/Notify notification message to the client (step, S702).

Through this procedure, the step of starting the registration session is ended, and the server may notify that the Hash commit information is available.

The client transmits a Read request for Registration Session Read/Notify message to the server (step, S703).

The Read request for Registration Session Read/Notify message includes a Server Hash Commit Message.

The Server Hash Commit Message is issued by the client as a Read Characteristic Value request.

The server transmits a Read response message to the client (step, S704).

That is, in response to the Server Hash Commit Message, the server transmits a Registration Session Read/Notify notification message. The message includes a Public Key H(KS_pub), a desired user Interaction Type and a hash of necessary Interaction Data.

The client stores the H(KS_pub) received from the server in order to confirm as a latest step. And the client displays a User interaction message to a user and waits until the user completes the interaction.

When the interaction of the user is completed, the server transmits the Registration Session Read/Notify notification message to the client (step, S705).

As such, the server hash commit step of the registration session is completed.

The client transmits the Write request for Registration Session Write message to the server (step, S706).

The Write request for Registration Session Write is a message for the read Characteristics Value Request for the server, and according to this, the Client Public Key step is performed.

The Write request for Registration Session Write message includes a client public key message, an X coordinate of the client public key KCX_pub, a Y coordinate of the client public key KCY_pub, a Nonce N_c generated by the client and an interaction result of a user.

The server that receives the message generates a Long Term Key (LTK) using the KCX_pub, KCY_pub, N_c and a server private-key (KS_priv).

The server transmits the Registration Session Read/Notify notification message to the client in order to notify that the generation of LTK is completed (step, S707).

As such, the client public key step of the registration session is completed.

The client transmits the Read request for Registration Session Read/Notify message to the server (step, S708).

The Server Public Key step is started by transmitting the Read request for Registration Session Read/Notify message.

The server that receives the Read request for Registration Session Read/Notify message generates a MAC key value for the KS_pub and allocates a registration ID to the client.

In this case, in response to the Read request for Registration Session Read/Notify message, the server may transmits an X coordinate of the server public key KSX_pub, a registration ID, a Nonce N_c generated by the server and a server MAC value MAC_s to the client. The server public key step of the registration session is completed as the server responds.

The client transmits the Write request for Registration Session Write message to the server (step, S709).

The client confirmation step is started by the Write request for Registration Session Write message.

Both of the server and the client store the registration IDs allocated to their own data base.

The Secure Session is a process for identifying whether a user is previously registered user. The client configures the characteristics by performing the Secure Session with the server. When the characteristics are configured once, the registration ID associated with it is treated as an Active Registration ID.

Figure 8:
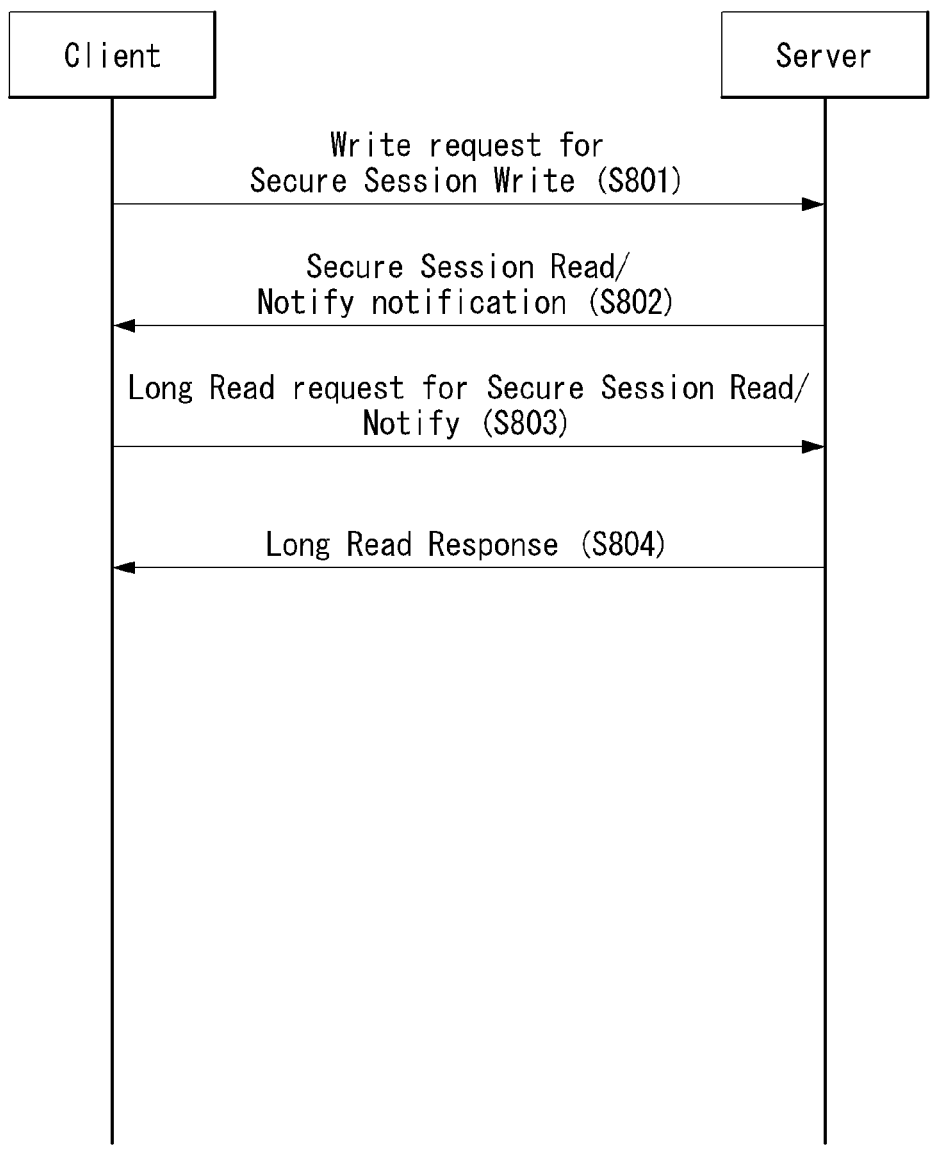
FIG. 8 is a flowchart illustrating a process of a secure session being performed between a client device and a server device to which the method proposed in the present disclosure is applicable.

FIG. 8 is a flowchart illustrating a process of a secure session being performed between a client device and a server device to which the method proposed in the present disclosure is applicable.

A client transmits a Write request for Secure Session Write message to a server (step, S801).

The Write request for Secure Session Write message may include a registration ID, a Secure Session Request Number and a Client Session Nonce N_c.

Before step, S801, the client may generate a Random Client Session Nonce.

The server that receives the Write request for Secure Session Write message confirms whether the registration ID is valid, and generates a Random Server Session Nonce N_s. Later, the server calculates a client session key using the LTK, N_c and N_s.

The server transmits a Secure Session Read/Notify Notification message to the client (step, S802).

The server transmits partial secure session information to the client.

The Secure Session Read/Notify Notification message may include a registration ID, a Secure Session Request Number and a Server Session Nonce N_s.

The client transmits a Long Read request for Secure Session Read/Notify message to the server (step, S803).

By transmitting the Long Read request for Secure Session Read/Notify message, the client requests all types of secure session information from the server.

The server transmits a Long Read response message to the client (step, S804).

Through the Long Read response message, the server transmits all types of secure session information to the client.

The Long Read response message may include a registration ID, a Secure Session Request Number and a Server Session Nonce N_s.

The client that receives the Long Read response message calculates the CSK using the LTK, N_c and N_s.

The Secure Get/Put operation corresponds to a method for retrieving, adding, deleting and updating a token in the server device. Each token means a unique unit that represents the user authentication information.

In order to start a token discovery procedure, the client should complete the secure session before the procedure. When an Active Registration ID is configured in the secure session, the client transmits a Secure Get-Token message for the token discovery.

The server transmits a Secure Get-Token response message to the client. The Secure Get-Token response message includes an active registration ID of the corresponding client and the related token. That is, the token may be asynchronously discovered through the secure session.

And, a new token may be added through a Secure Put message or the token already existed may be updated or deleted.

In other words, the client may add, update or delete the token using the Token Add/Update/Delete action for the Secure Put characteristics. In order to take such an action, the client should complete the registration session.

In the case that the action transmitted by the client is the token add/update action and the token in relation to the registration ID of the client, token version/issuer and authentication set is not stored in the database of the server, the server adds a new token in the database of the server.

And, in the case that the action transmitted by the client is the token add/update action and the token in relation to the client is stored in the server, the server updates the token which is already stored or add a new token.

And, in the case that the server receives a Secure Get-Delete token message and the token in relation to the client is stored in the database of the server, the server delete the corresponding token from the database of the server.

In the present disclosure, a mode and state of a device for Handover, a procedure performed by the device and the message and the parameters that should be exchanged between devices are defined as follows.

- Mode: a state in which a device is set to perform a specific operation
- State: represents a procedure that a device is set to perform during a communication procedure
- Procedure: a series of processes that a device should perform in order to perform a specific function
- Message: represents an operation for sending a parameter between devices Parameter: represents a data value sent by a message to a counterpart or a setting value of a device First Embodiment In the embodiment, a method for connecting two devices using a control device is proposed.

Particularly, a method for two devices being connected is proposed in the case that two devices are proximate to the control device within a predetermined time.

Figure 9:
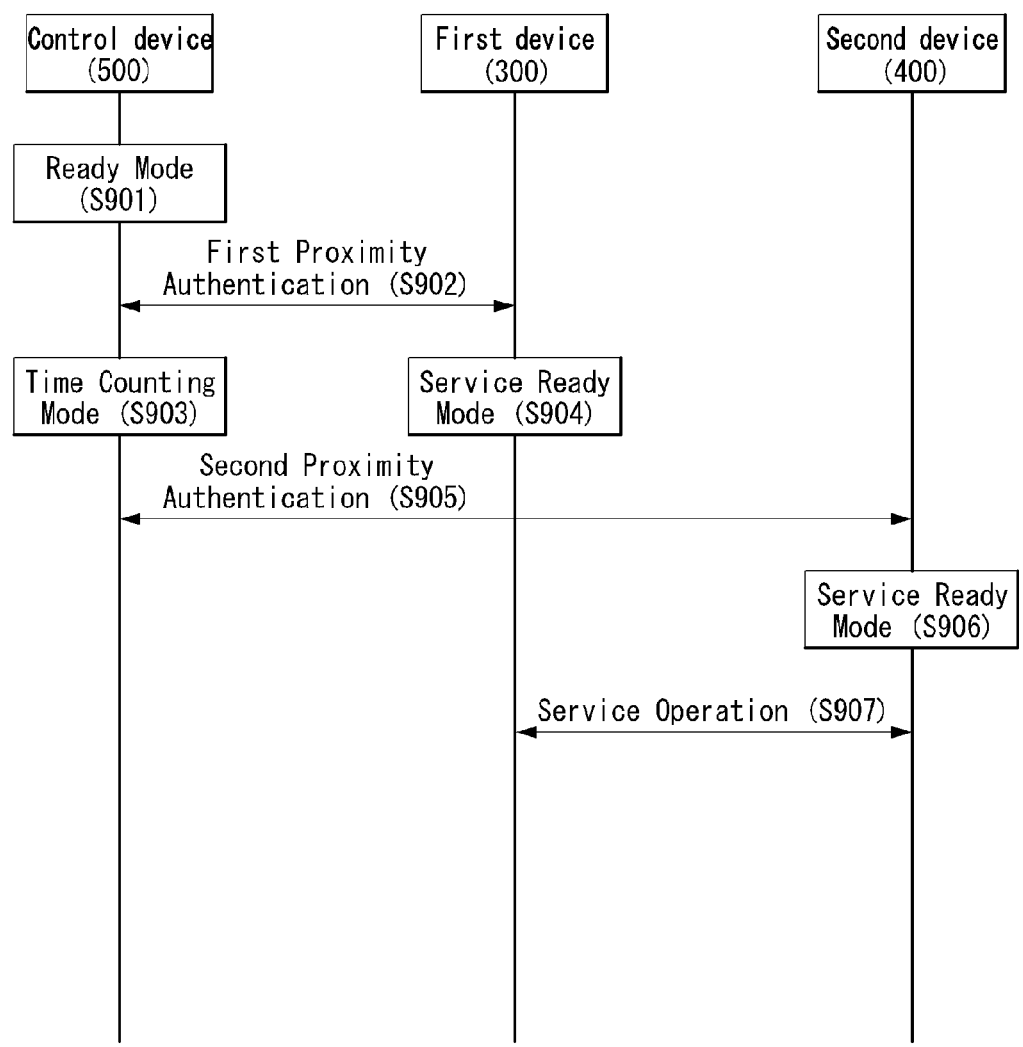
FIG. 9 is a flowchart illustrating an embodiment of a method for connecting a device by acquiring the proximity information of device proposed in the present disclosure.

FIG. 9 is a flowchart illustrating an embodiment of a method for connecting a device by acquiring the proximity information of device proposed in the present disclosure.

A user switches a control device 500 in a ready mode (step, S901).

For example, a wearable device, a remote controller, a phone, and the like may be used as the control device 500.

The ready mode refers to as the mode for waiting the procedure of a First Proximity Authentication or a Second Proximity Authentication that will be described below. In the case of BLE, the scanning state or the advertising state is maintained.

That is, the control device 500 that enters the ready mode may enter the advertising state or the scanning state.

Before step, S901, the control device 500 may perform a User Information Exchange procedure with a user.

The User Information Exchange procedure represents a procedure for the control device to identify (or register) a user using the information such as fingerprint, retina and iris, pulse of the user. And the user information refers to as a key or token value which is generated as a result of the identification of the user. The user information may be generated through the User Information Exchange procedure.

In other words, the control device 500 may accept input of the user information from the user and register the user information.

Through this procedure, the control device 500 may recognize the user that uses the control device 500, and generate the key or token for security after recognizing the user.

In this case, the user authentication service described in FIG. 7 and FIG. 8 above may be used, and the registration ID and token for recognizing the user may be generated and stored. That is, through the User Information Exchange procedure, it may be agreed how the user is recognized in the process of exchanging the server hash commit message of the registration session.

When the control device 500 recognizes a user, fingerprint, pulse, password, and the like of the user may be used.

When the control device 500 approaches to another device, the First Proximity Authentication procedure is started with the adjacent device (step, S902).

In describing the present embodiment, for the convenience of description, the device that approaches to the control device 500 first is referred to as a first device 300, and the device that approaches to the control device 500 latter is referred as a second device 400.

And, in the case, it is assumed that the first device 300 and the second device 400 that approach to the control device 500 are in ready mode.

That is, the control device 500 may perform a First Proximity Authentication procedure with the first device 300 that is firstly approached to the control device 500.

The control device 500 that performs the First Proximity Authentication procedure with the first device 300 enters time counting mode (step, S903).

The time counting mode means the mode for waiting a Second Proximity Authentication after the control device performs the First Proximity Authentication. The control device sets a time off value and waits until the Second Proximity Authentication procedure is performed for the time as much as the time off value. The time off value will be described in detail below.

That is, the control device 500 that enters the time counting mode waits until the second device 400 approaches and the Second Proximity Authentication procedure is performed for a predetermined time.

The detailed procedures of the First Proximity Authentication and the Second Proximity Authentication will be described below.

And, the first device 300 that performs the First Proximity Authentication enters a service ready mode (step, S904).

The service ready mode is referred to as the mode in which the device that performs the First Proximity Authentication waits for the service to be performed or service information.

Here, the service information is referred to as the message that the control device 500 notifies what service should be performs to another device.

That is, the first device 300 that performs the First Proximity Authentication procedure with the control device 500 is switched from the ready mode to the service ready mode in order to connect and/or perform service with the second device 400.

When the control device 500 approaches to the second device in the time counting mode, the Second Proximity Authentication procedure is performed (step, S905).

When the Second Proximity Authentication procedure is performed, the second device 400 enters the service ready mode (step, S906).

That is, the second device 400 is switched from the ready mode to the service ready mode in order to connect and/or perform service with the first device 300 that is authenticated in the First Proximity Authentication procedure by being authenticated from the wearable device 500.

The connection and/or service are/is performed between the first device 300 and the second device 400 that are in the service ready mode (step, S907).

The service performed between the first device 300 and the second device 400 may be determined in the First Proximity Authentication procedure and the Second Proximity Authentication procedure and performed simultaneously with the connection, or the service may be performed by waiting for the service determination (i.e., service information) of a user and receiving the information of the service or instruction.

For example, in the case that a user selects the service after step, S905, the control device 500 notifies the authentication for the first device 300 and the second device 400 to be completed to the user and shows a screen through which a service can be selected.

When the user selects the service, the information of the service selected by the user is forwarded to the first device 300 and/or the second device 400 through the service information message, and the first device 300 and/or the second device 400 that receive(s) it may perform the selected service.

The flowchart of FIG. 9 is just an example and the present invention is not limited thereto, but it is understood that the step or procedure illustrated in FIG. 9 may be changed or other step or procedure may be added.

Referring to the drawing below, the First Proximity Authentication procedure and the Second Proximity Authentication procedure will be described.

Figure 10:
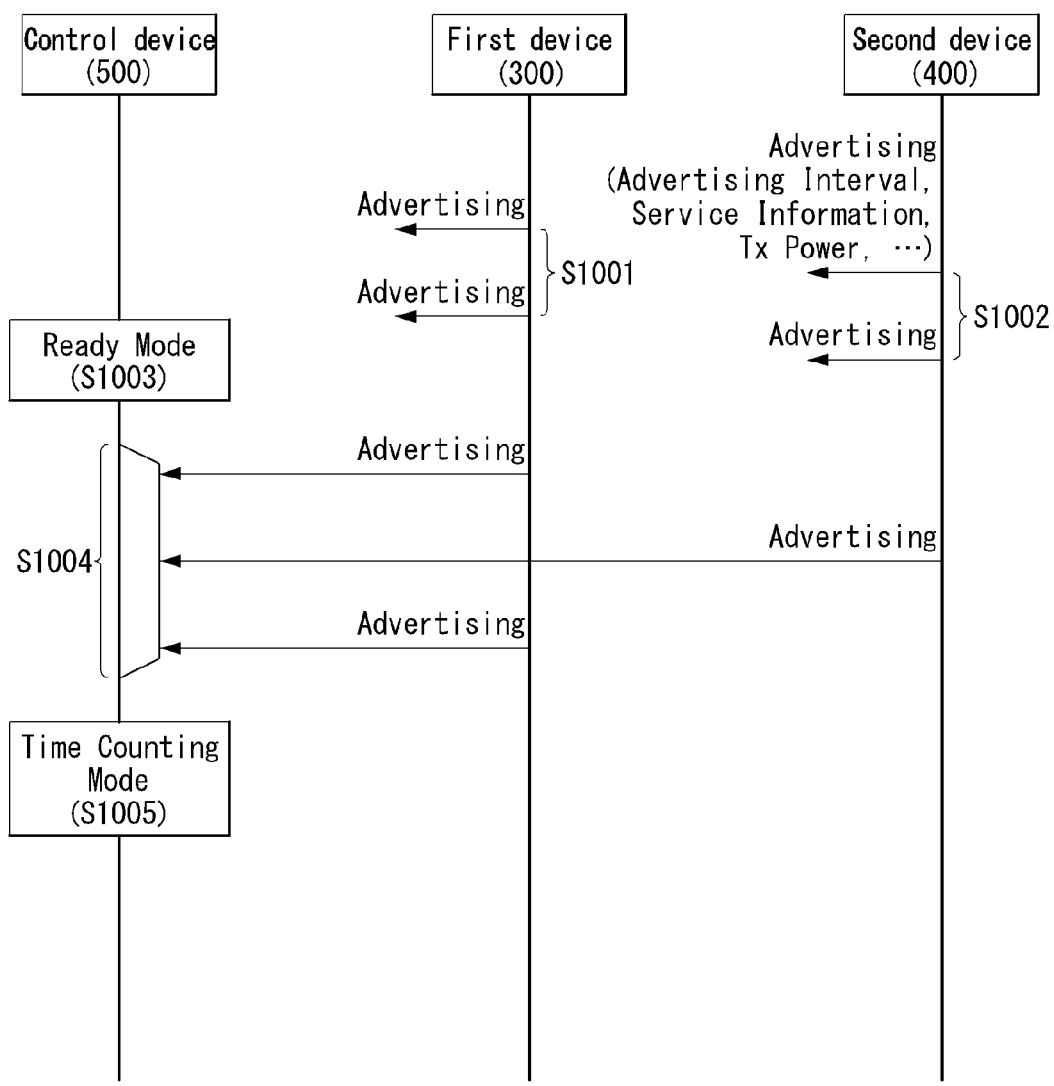
FIG. 10 is a flowchart illustrating an example of a method for connecting a device by acquiring the proximity information of a device proposed in the present disclosure.

FIG. 10 is a flowchart illustrating an example of a method for connecting a device by acquiring the proximity information of a device proposed in the present disclosure.

Hereinafter, the advertising message transmitted in the first device is referred to as a first advertising message, and the advertising message transmitted in the second device is referred to as a second advertising message.

The first device 300 and the second device 400 transmit an advertising message (steps, S1001 and S1002).

As described above, the first device 300 and the second device 400 may transmit the advertising message continuously since the first device 300 and the second device 400 are in the ready mode.

In addition, the first device 300 and the second device 400 may transmit the parameter for identifying the transmission power (Tx power) information and the proximity information through the advertising message to peripheral devices.

That is, the advertising message may include the parameter such as an advertising interval, the service information and the transmission power (Tx power).

In this case, the advertising message may be transmitted in broadcasting scheme or unicasting scheme.

The user switches the control device 500 to the ready mode (step, S1003).

As described above, the control device 500 may be switched to the ready mode after registering the user information through the user authentication service (refer to FIG. 7 and FIG. 8 above), and switched to the ready mode through a user input.

The control device 500 in the ready mode receives the first advertising message from the first device in the scanning state (step, S1004).

Through this process, the control device 500 identifies that the first device 300 is near and may perform the First Proximity Authentication.

The First Proximity Authentication corresponds to the procedure of authenticating that the control device 500 approaches to the first device between two devices that the control device 500 is going to connect.

The control device 500 may calculate a first distance value which is the distance value that represents distance from the first device 300 based on the first advertising message received. And, in the case that the first distance value calculated is smaller than a threshold value which is preconfigured to determine whether the first device 300 is near the control device 500, the control device 500 may determine the first device 300 is near.

In the case that it is determined that the first device 300 is near, the control device 500 may authenticate that the first device 300 is near. In this case, the service capability exchange procedure that identifies the service available to be provided may be performed together.

In the case that the service information parameter that is provided through the advertising message adequately expresses the service that the first device 300 is available to provide, the service capability exchange procedure may be omitted. It is because the control device 500 may identify which service the first device 300 provides without the service capability exchange procedure, in this case.

And, in the case that the service information provided through the advertising message is inadequate, the control device 500 may connect with the first device 300 and exchange the service information through the GATT (the method of exchanging information after the BLE connection).

The control device 500 that performs the First Proximity Authentication with the first device 300 enters the time counting mode (step, S1005).

As described above, in the time counting mode, the control device 500 waits for the Second Proximity Authentication procedure to be performed.

In this case, similar to the First Proximity Authentication procedure, the Second Proximity Authentication procedure may be performed between the control device 500 and the second device 400.

The Second Proximity Authentication procedure is referred to as the procedure of authenticating that the control device 500 approaches to the second device (i.e., the second device 400) among the two devices that the control device 500 is going to connect.

The control device 500 may receive the second advertising message from the second device 400 in the scanning state, and calculate a second distance value that represents the distance from the second device based on the second advertising message received.

And, in the case that the second distance value is smaller than the threshold value, it may be determined that the second device 400 and the control device 500 comes near. Through this procedure, the control device 500 may authenticate that the second device 400 approaches to the control device 500.

In addition, the control device 500 may perform the Second Proximity Authentication with the second device 400 that is proximate to a specific time. In this case, the control device 500 may configure the specific time for waiting until the Second Proximity Authentication procedure is performed in the time counting mode by calculating the second distance value based on the second advertising message which is received within the specific time after the First Proximity Authentication procedure is performed (or the first distance value is calculated).

FIG. 11 is a view illustrating a parameter in a link layer packet format and an advertising message according to an embodiment of the present invention.

Referring to FIG. 11A, the advertising message in the form of a Packet Data Unit (PDU) may be transmitted as described above.

And, for example, the parameter in the advertising PDU transmitted in the first device 300 and/or the second device 400 may be shown in FIG. 11B. That is, the parameter such as Advertising Interval, Service Information and transmission power (Tx power) may be transmitted in the AD type, and each parameter value may be transmitted in the AD data.

With reference to drawings below, the First Proximity Authentication procedure and the time counting mode will be described in more detail.

Figure 12:
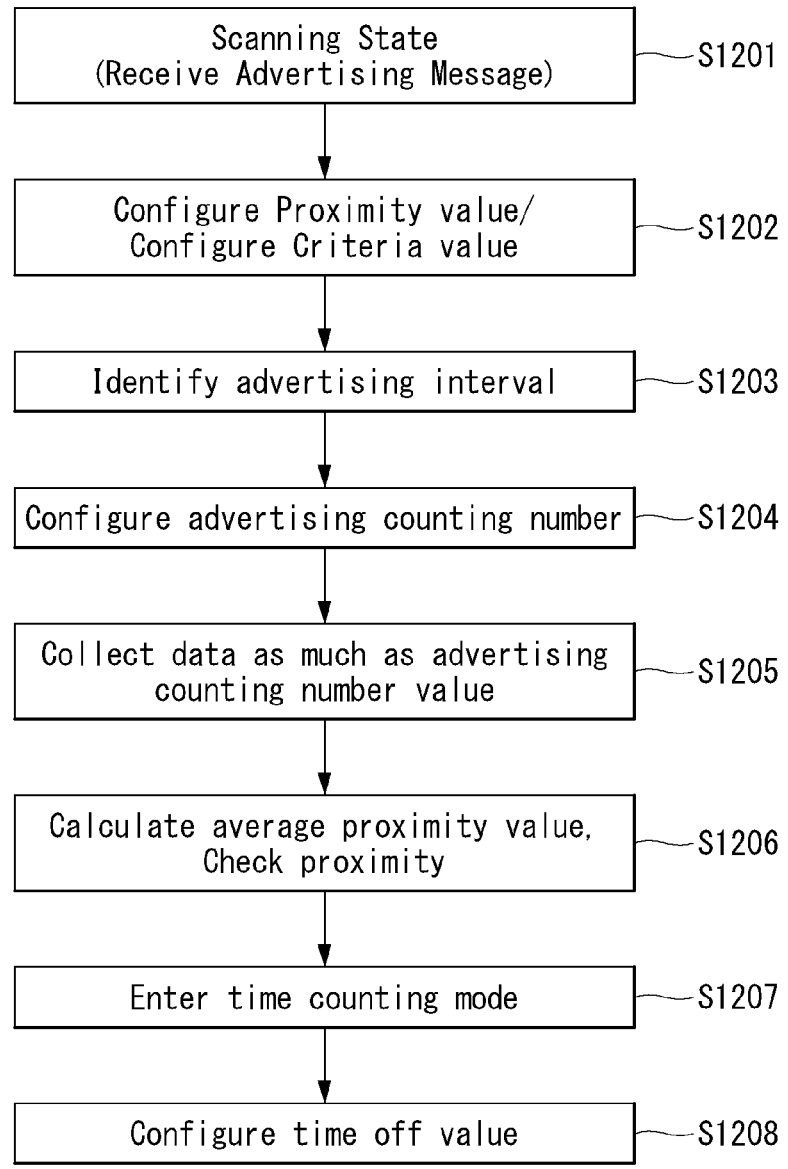
FIG. 12 is a flowchart illustrating an example of a method for connecting a device by acquiring the proximity information of the device proposed in the present disclosure.

FIG. 12 is a flowchart illustrating an example of a method for connecting a device by acquiring the proximity information of the device proposed in the present disclosure.

The control device 500 receives the first advertising message from the first device 300 in the scanning state (step, S1201).

The control device 500 configures a criteria value with a proximity value in order to determine the proximity of the first device 300 (step, S1202).

Herein, the proximity value represents a value for determining whether a device is near or distant. For example, the Received Signal Strength Indication (RSSI) may be used as the proximity value.

That is, the control device 500 may calculate the first distance value that represents a distance from the first device 300 using the proximity value.

The criteria value represents a value for determining whether the control device 500 is near from the proximity degree of the control device 500 to another device. The criteria value may be referred to as a threshold value.

In this case, the criteria value or the threshold value may be configured in the control device 500.

The control device 500 may calculate the proximity value or an average proximity value that takes an average of the proximity values, and determine whether a device is near or not by comparing it with the criteria value or the threshold value.

The proximity of a device may be determined by obtaining the proximity value using an advertising message or by obtaining the average proximity value using a plurality of advertising messages.

Below is assumed and described the case that the average proximity value is calculated using a plurality of advertising messages.

In the case of using a plurality of advertising messages (the first advertising message or the second advertising message), the accuracy may be improved when determining the proximity of the counterpart device by calculating the average value of it.

For this, the control device 500 is required to determine the proximity based on how many advertising messages are received.

The control device 500 recognizes an advertising interval, and configures an advertising counting number (steps, S1203 and S1204).

In this case, the advertising counting number is configured in the control device 500.

The control device 500 collects the first advertising message as much as the advertising counting number value (step, S1205).

The control device 500 calculates the average proximity value by collecting the first advertising message as much as the advertising counting number value (step, S1206).

The proximity of the first device 300 may be determined by comparing the calculated average proximity value with the criteria value or the threshold value which configured in step, S1202.

When it is determined that the first device 300 is near, the control device 500 may authenticate that the first device 300 is near.

After performing the First Proximity Authentication as such, the control device 500 enters the time counting mode (step, S1207).

The control device 500 that enters the time counting mode waits until the Second Proximity Authentication procedure is performed.

The control device 500 that enters the time counting mode configures a time off value (step, S1208).

Herein, the time off value represents a time value for maintaining the time counting mode.

As described above, after the First Proximity Authentication procedure is performed (or after the first distance value is calculated), the control device 500 may calculate the second distance value based on the second advertising message which is received within the time of the time off value.

In the case that the Second Proximity Authentication does not occur within the time, the control device 500 enters the ready mode again.

In the case of configuring the time off value too long, the Second Proximity Authentication that is untended by a user may be performed.

On the contrary, in the case that the time off value is configured to be too short, the time counting mode may be ended before the Second Proximity Authentication is performed. Accordingly, the advertising interval of neighboring devices should be considered when configuring the time off value.

Second Embodiment

In the embodiment, a method for authorizing to communicate or to control by recognizing or identifying a user between devices is proposed.

In particular, in this embodiment, when a user wears a first control device (e.g., a wearable device), a method is proposed for acquiring authorization and controlling devices located within the range (i.e., specific distance range) of the first control device without any special procedure by utilizing a second control device (e.g., remote controller or phone).

As described above, a wearable device, a remote controller, a phone, and the like may be used as the control device.

Figure 13:
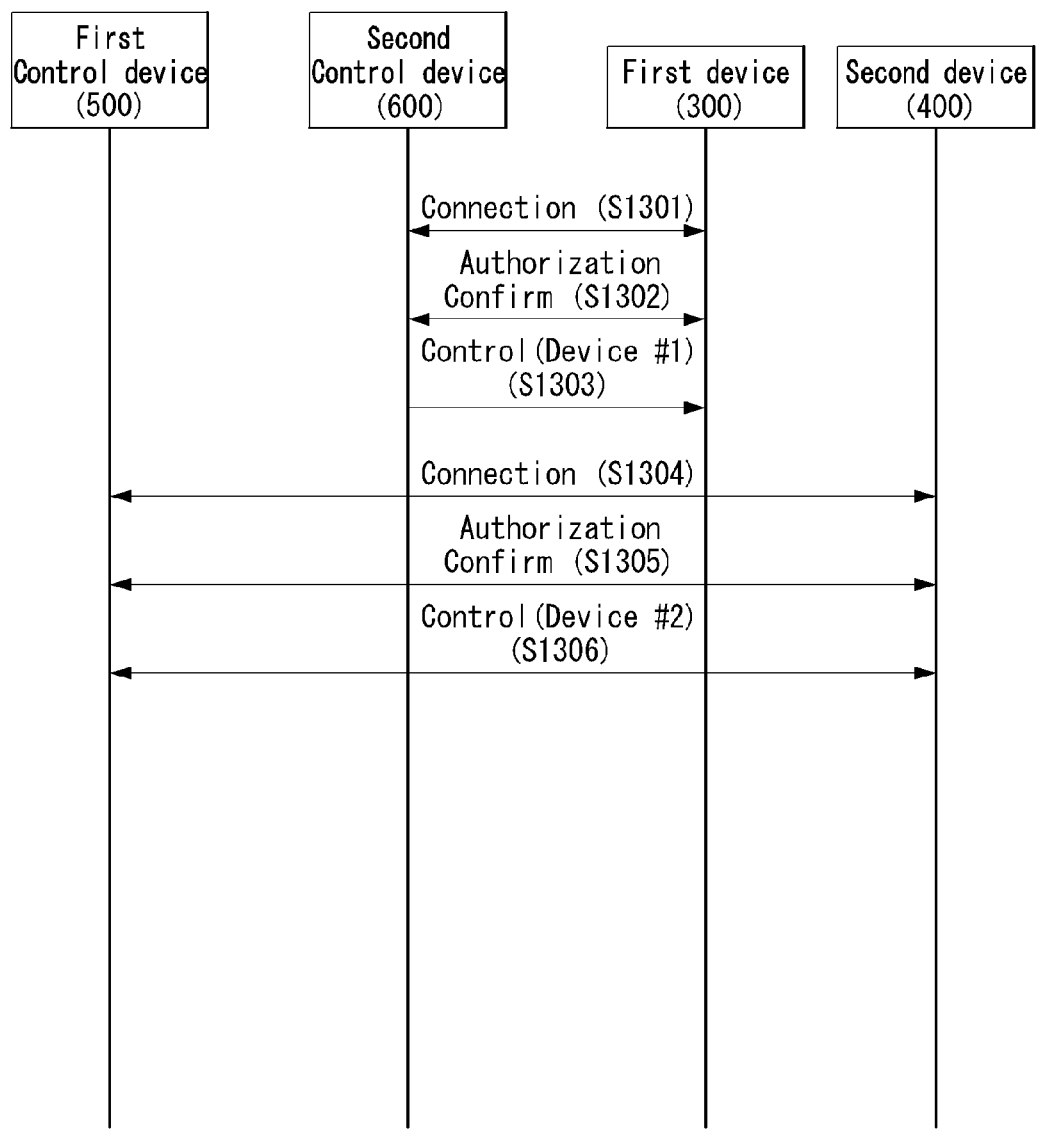
FIG. 13 is a flowchart illustrating an example of a method for controlling a device by identifying authorization information of the device proposed in the present disclosure.

FIG. 13 is a flowchart illustrating an example of a method for controlling a device by identifying authorization information of the device proposed in the present disclosure.

Referring to FIG. 13, it is presumed that the information of a user is registered in the first control device 500, the second control device 600, the first device 300 and the second device 400 through a user information exchange procedure with the user.

In this case, as described above, the user authentication service described in FIG. 7 and FIG. 8 above may be used, and the registration ID and token for recognizing the user may be generated and stored. That is, in the process of exchanging the server hash commit message of the registration session through the User Information Exchange procedure, it may be agreed which way the user is recognized.

In the case that an instruction or an input of a user for the control of the first device 300 occurs, the second control device 600 performs a connection with the first device 300 (step, S1301).

The second control device 600 and the first device 300 perform an Authorization Confirm procedure (step, S1302).

The Authorization Confirm procedure represents a procedure in which an authentication is performed by referring to user information and negotiation is made which level of authority is allowed in the communication/control.

That is, the second control device 600 and the first device 300 may exchange the information of a registered user, and identify the authority which is authorized to the registered user.

Particularly, the second control device 600 that stores a first token and the first device 300 that stores a second token may exchange the stored tokens, and it may be determined whether the user represented by the first token and the user represented by the second token are identical. And, in the case that the user is identical, the second control device 600 may control the first device 300.

Here, the first token means a token generated from the first user information that represents a first user registered in the second control device 600, and the second token means a token generated from the second user information that represents a second user registered in the first device 300.

According to the authorized authority, the first device 300 may permit the control of the second control device 600. In other words, the control range of the first device 300 may be configured based on the token value.

After performing the Authorization Confirm procedure, the second control device 600 controls the first device 300 (step, S1303).

In the case that an instruction or an input of a user for the control of the second device 400 occurs, the first control device 500 performs a connection with the second device 400 (step, S1304).

The first control device 500 and the second device 400 perform an Authorization Confirm procedure (step, S1305).

After performing the Authorization Confirm procedure, the first control device 500 controls the second device 400 (step, S1306).

With reference to the drawing below, the process of negotiating a control authority through the Authorization Confirm procedure will be described.

Figure 14:
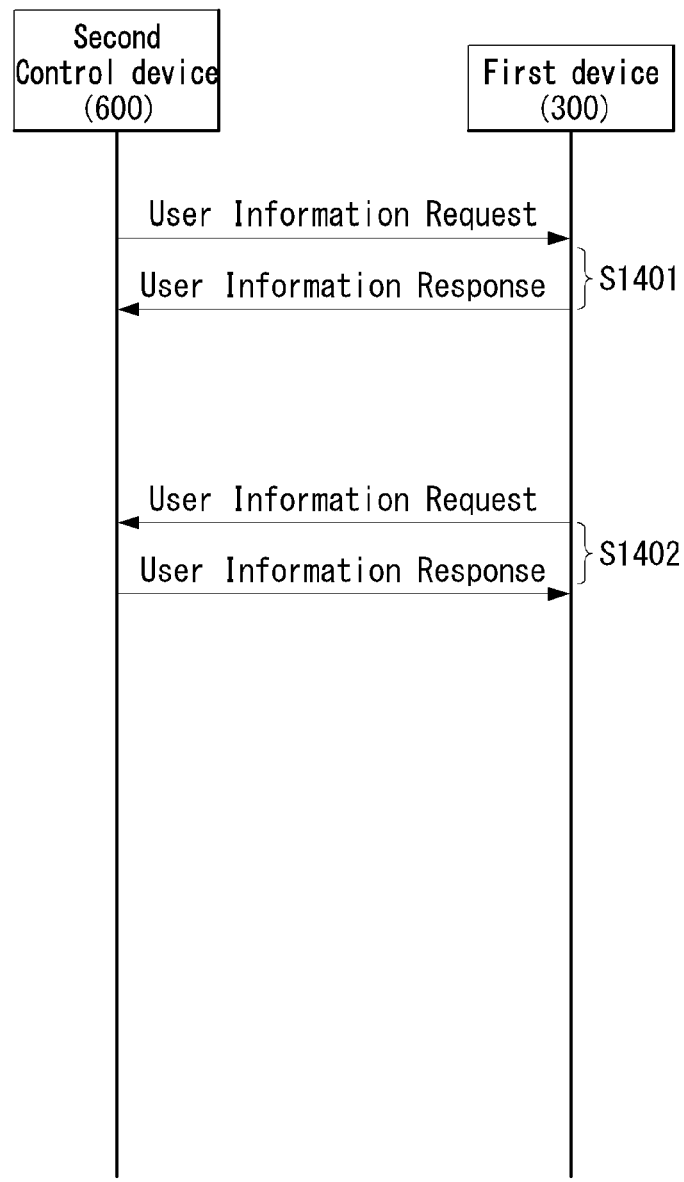
FIG. 14 is a flowchart illustrating an example of a method for controlling a device by identifying the authorization information of the device proposed in the present disclosure.

FIG. 14 is a flowchart illustrating an example of a method for controlling a device by identifying the authorization information of the device proposed in the present disclosure.

The Authorization Confirm procedure (steps, S1302 and S1305) shown in FIG. 13 above will be described in detail by reference to FIG. 14. First, it will be described under the presumption that a user registers the first device 300 as own device with the second control device 600 through the user information exchange procedure.

The second control device 600 and the first device 300 transmits and receives a User Information Request/Response Message in the Authorization Confirm procedure (steps, S1401 and S1402)

The User Information Request/Response Message represents a message for requesting and responding whether a counterpart has the valid information (key or token, etc.) for the user in the Authorization Confirm procedure.

That is, by exchanging the token or key value stored in the second control device 600 and the first device 300, it is identified whether the counterpart has valid user information.

In this case, the second control device 600 may send a User Information Request to the first device 300 and the first device 300 may send a User Information Response (step, S1401), and the first device 300 may send a User Information Request to the second control device 600 and the second control device 600 may send a User Information Response to the first device 300 (step, S1402).

In addition, the parameter may be exchanged or identified in relation to the fact whether the key or token value that identifies a user is included between devices.

After the Authorization Confirmation, the first device 300 may identify which authority is authorized to user A, and perform the operation for the connection or control according to the identified authority. In the case that user A has the authority for all functions of the first device 300, all of the function may be allowed.

Figure 15:
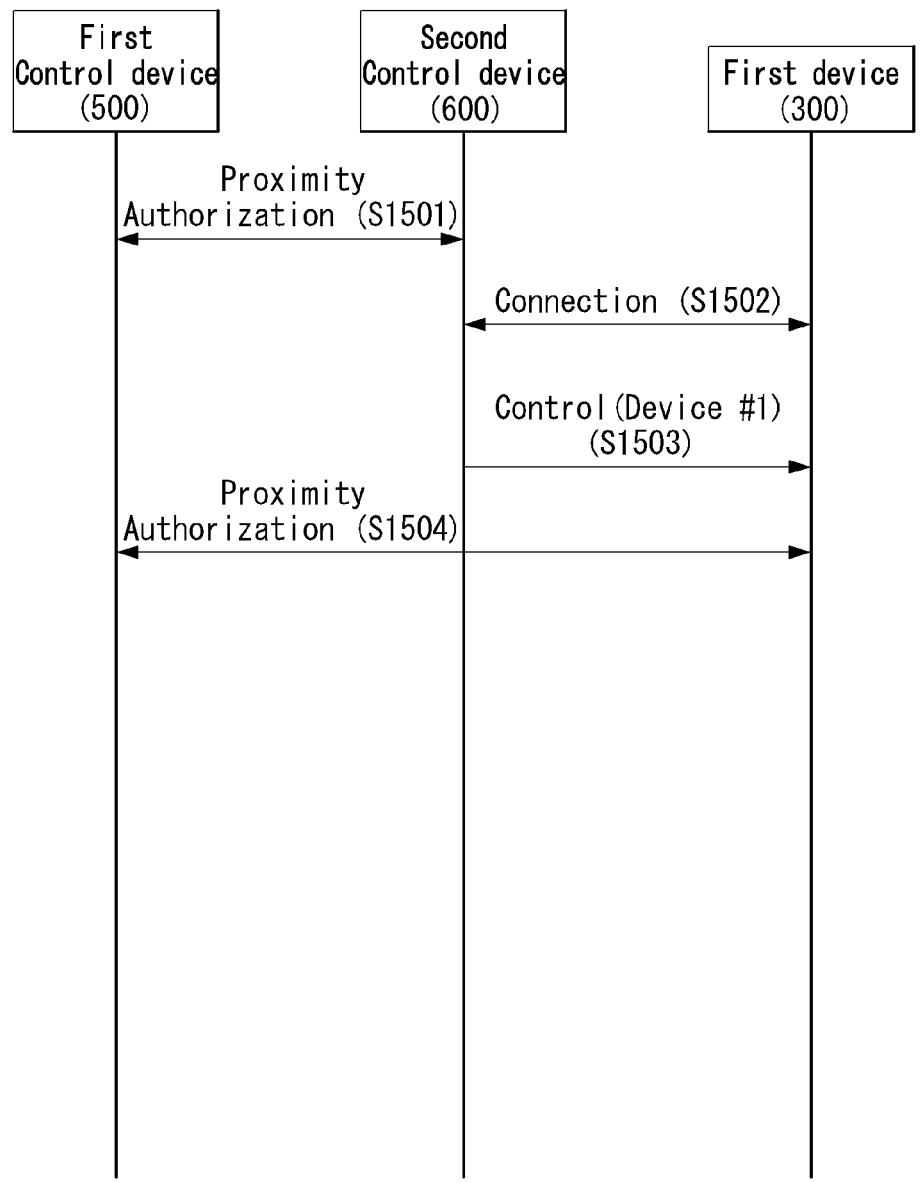
FIG. 15 is a flowchart illustrating an example of a method for controlling a device by identifying authorization information of the device proposed in the present disclosure.

FIG. 15 is a flowchart illustrating an example of a method for controlling a device by identifying authorization information of the device proposed in the present disclosure.

Referring to FIG. 15, the process for negotiating a control authority is defined through a Proximity Authorization procedure performed by the first control device 500 with adjacent devices.

The Proximity Authorization procedure represents a procedure for a control device to authorize neighboring devices by identifying neighboring devices. The authorized devices are able to control each other according to the authority.

The first control device 500 and the first device 300 may have the information of user A through the User Information Exchange procedure. On the contrary, the second control device 600 may not have the information of user A.

The first control device 500 performs the Proximity Authorization procedure with the second control device 600 (step, S1501).

Before step, S1501, a Bluetooth connection may be established between the first control device 500 and the second control device 600.

In this case, for example, the second control device 600 may identify the user information by exchanging the token or key value that may identify the user which is exchanged in the User Information Exchange procedure with the first control device 500.

In other words, the first control device 500 may transmit a first token that is generated from the first user information that represents the first user to the second control device 600.

In this case, the first control device 500 calculates the first distance value that represents the distance from the second control device 600. In the case that the first distance value is smaller than the threshold value which is configured to determine the proximity from the first control device in the first control device, the first control device 500 may transmit the first token to the second control device 600. Otherwise, the token or key value exchanged by the first control device 500 and the second control device 600 may be valid in the case that the second control device 600 is close to the first control device 500.

And, in the case that the second control device 600 does not have the information of user A, the second control device 600 may identify the user information by exchanging a value in a different form from the token or key value which is generated through the User Information Exchange directly with user A. For example, the token or key value exchanged by the first control device 500 and the second control device 600 may be a value in relation to Temporary User Information.

The second control device 600 that performs the Proximity Authorization performs a connection with the first device 300 (step, S1502).

In this case, the key or token value that represents a user may be exchanged between the second control device 600 and the first device 300.

Particularly, the first token and the first device 300 that are stored in the second control device 600 may be exchanged each other, and it may be determined whether the user represented by the first token and the user represented by the second token are identical. And, in the case that the users are identical, the second control device 600 may control the first device 300.

Here, the first token means a token generated from the first user information that represents a first user registered in the second control device 600, and the second token means a token generated from the second user information that represents a second user registered in the first device 300.

The second control device 600 transmits how to control through the control message to the first device 300 (step, S1503).

The first device 300 performs the Proximity Authorization procedure with the first control device 500 (step, S1504).

That is, the first device 300 may exchange the token or key value that enables to identify a user through the Proximity Authorization procedure with the first control device 500.

And, by determining whether the corresponding user is a user to be permitted to have the control authority, the first device 300 may permit the second control device 600 to control it (i.e., the first device 300).

And, the first device 300 may authorize the control authority to the second control device 600 only in the case that the first device 300 is near to the first control device 500.

In addition, the first device 300 may check whether the second control device 600 is in the state of exchanging the token or key value that enables to identify a user from the first control device 500 (i.e., whether to perform the Proximity Authorization) when the second control device 600 and the first device 300 establish a connection procedure (step, S1502), or may check whether the second control device 600 is authorized by performing an additional procedure (e.g., the Authorization Confirm).

Furthermore, the control range of the first device 300 may be configured based on the first token value which is transmitted from the second control device 600 to the first device 300.

In addition, the Proximity Authorization procedure between the first control device 500 and the first device 300 may be performed on the time when the second control device 600 is going to control the first device 300, or may be performed at the previous step. For example, immediately when the first control device 500 finds the first device 300, the Proximity Authorization procedure between the first control device 500 and the first device 300 may be performed.

In the present embodiment, the first control device 500, the second control device 600 and the first device 300 may be called the first device, the control device and the second device, respectively.

Third Embodiment

In this embodiment, a method for authorizing an Authority Manager 700 to control neighboring devices, withdrawing or changing the authority is proposed.

That is, in this embodiment, the Authority Manager is defined, and a method for the Authority Manager to authorize a user device to control public devices, to withdraw or change the authority.

The Authority Manager may check whether a counterpart device has user information, and authorize the counterpart device to connect or control in the case that the counterpart device has authenticated user information.

Figure 16:
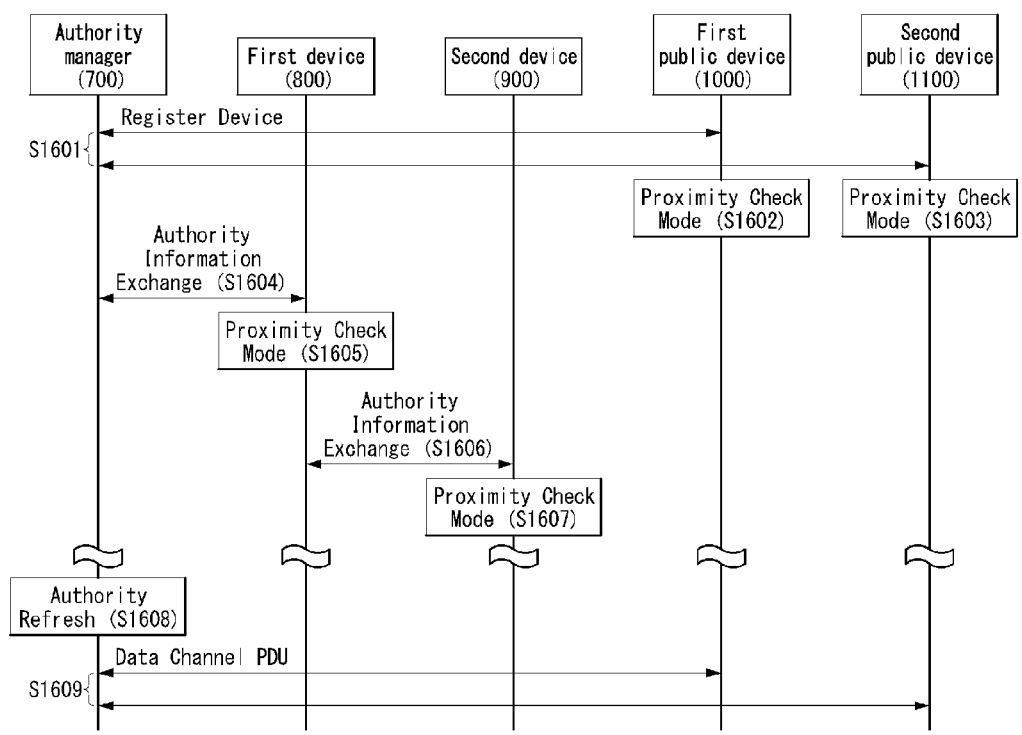
FIG. 16 is a flowchart illustrating an example of a method for controlling a device by checking the authorization information of the device proposed in the present disclosure.

FIG. 16 is a flowchart illustrating an example of a method for controlling a device by checking the authorization information of the device proposed in the present disclosure.

The Authority Manager 700 registers a first public device 1000 and a second public device 1100 (step, S1601).

The first public device 1000 and the second public device 1100 that are registered in the Authority Manager 700 through the register device procedure in step, S1601, enter a proximity check mode (steps, S1602 and S1603).

Here, the proximity check mode represents a mode for examining the proximity from the Authority Manager 700. When a device is apart from the Authority Manager 700 by a predetermined distance, the Authority Manager 700 changes the information related to the control authority for devices by performing an Authority Refresh procedure.

In the Register Device procedure, user information may be registered through the user authentication service described in FIG. 7 and FIG. 8.

The first device 800 performs an Authority Information Exchange procedure with the Authority Manager 700 (step, S1604).

The Authority Information Exchange procedure represents a procedure that the Authority Manager 700 authorizes a user device for the public devices.

That is, the Authority Manager 700 may forward (or grant) the authority for controlling the first public device 1000 and/or the second public device 1100 to the first device 800, which is a device of user A through the Authority Information Exchange procedure with the first device 800.

In this case, the Authority Manager 700 may check user A of the first device 800 through the Authorization Confirm procedure.

And, the rigorous check of user information such as the authority for a personal user device may not be required for the control authority for the public device. In this case, the Authorization Confirm procedure may be performed using a value of a different form from the key or token value that is generated through the direct user information exchange with user A. For example, the Authorization Confirm procedure may be performed by exchanging the token or key value for temporary user information.

The temporary user information represents the user information which is generated temporarily by a device, not through the user information exchange procedure. The devices such as the public devices require the information for recognizing a user, but it may be hard to possess the user information. In such a case, the temporary user information is generated and used for recognizing a user.

That is, simplified token or key value may be used or simplified Authorization Confirm procedure may be performed for a temporal user.

After checking that it is the device of user A, the Authority Manager 700 may authorize to connect, control or communicate for the first public device 1000 and/or the second public device 1100 through an Authorization Write/Confirm message.

The Authorization Write/Confirm message is referred to as the message for handing over the authority for the public device during the Authority Information Exchange procedure, or for responding it.

The first device 800 that takes the authority is available to control the first public device 1000 and/or the second public device 1100.

In the case that the first device 800 tries to control or to communicate with, the first public device 1000 and/or the second public device 1100 may check whether the first device 800 is the device authorized to communicate with or control the first public device 1000 and/or the second public device 1100 by asking it to the Authority Manager 700.

In this case, the first public device 1000 and/or the second public device 1100 may directly possess the user information of user A, or identify user A using the Temporary User Information.

The first device 800 that performs the Authority Information Exchange procedure enters the Proximity Check Mode (step, S1605).

The devices that enter the Proximity Check Mode check the proximity of counterpart device using various methods such as proximity profile, and so on.

For example, the proximity check may be performed by the method for determining the proximity described in the first embodiment above. That is, the first distance value and the second distance value described above in the Proximity Check Mode may be periodically calculated.

In the case that the second device 900 which is the device of user A is going to control the first public device 1000 and/or the second public device 1100, the second device 900 performs the Authority Information Exchange procedure with the first device 800 that is already authorized (step, S1606).

That is, the second device 900 may be authorized to control or communicate with the first public device 1000 and/or the second public device 1100 from the first device 800 that is already authorized.

However, the present embodiment is not limited thereto, but the second device 900 may be authorized from the Authority Manager 700 by performing the Authority Information Exchange procedure with the Authority Manager 700 like the first device 800.

The second device 900 that performs the Authority Information Exchange procedure enters the Proximity Check Mode (step, S1607).

As described above, the devices except the Authority Manager 700 may communicate or control in the Proximity Check Mode. That is, the devices may communicate or control effectively within the proximity range with the Authority Manager 700.

In the case that the first device 800 and/or the second device 900 get out of the proximity range from the Authority Manager 700, the Authority Manager 700 performs an Authority Refresh procedure (step, S1608).

In order to perform the authority refresh or change, the Authority Manager 700 transmits an authority refresh message in the form of Data Channel PDU (step, S1609).

The authority refresh procedure will be described by reference to the drawing below.

Figure 17:
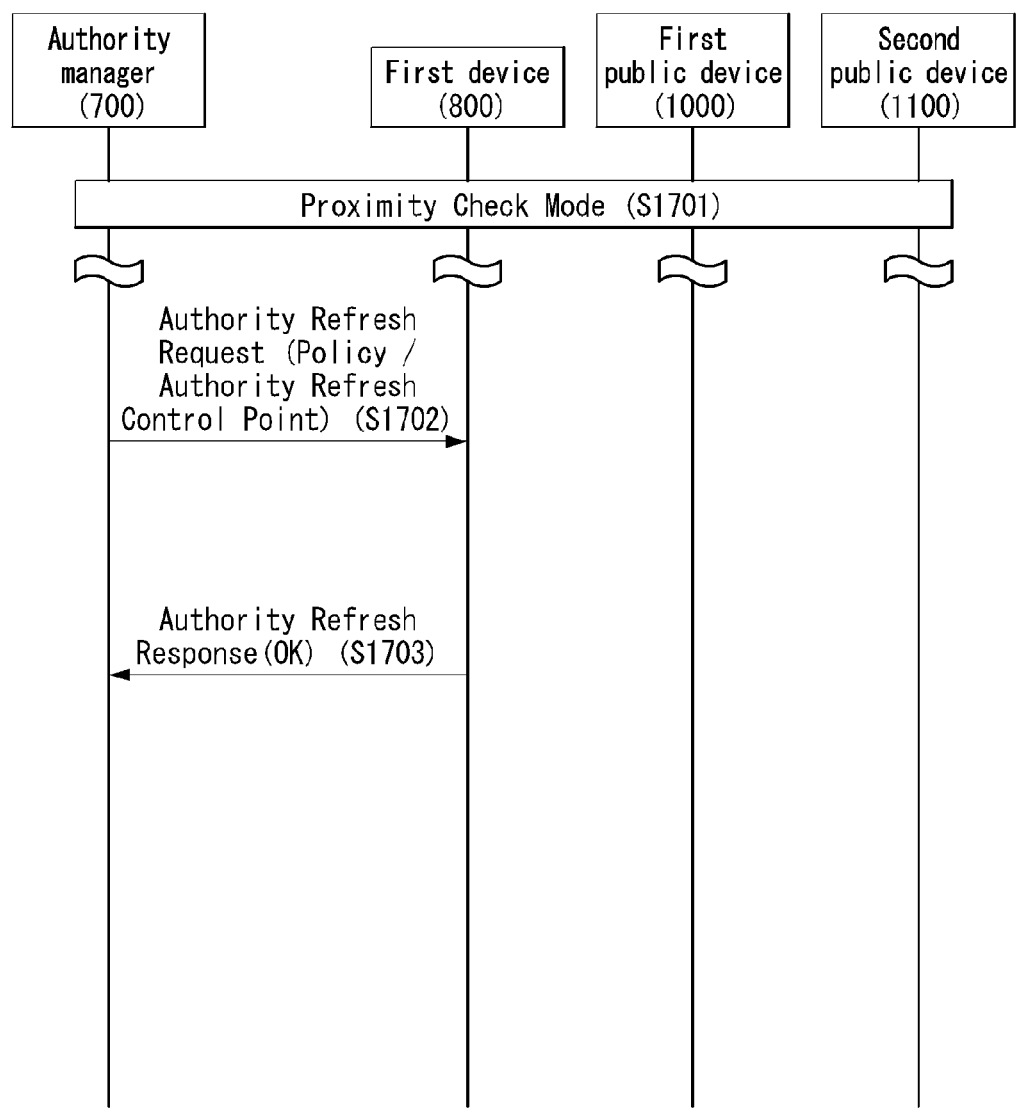
FIGS. 17 and 18 are flowcharts illustrating an example of a method for changing or discarding the authorization information of a device proposed in the present disclosure.
Figure 18:
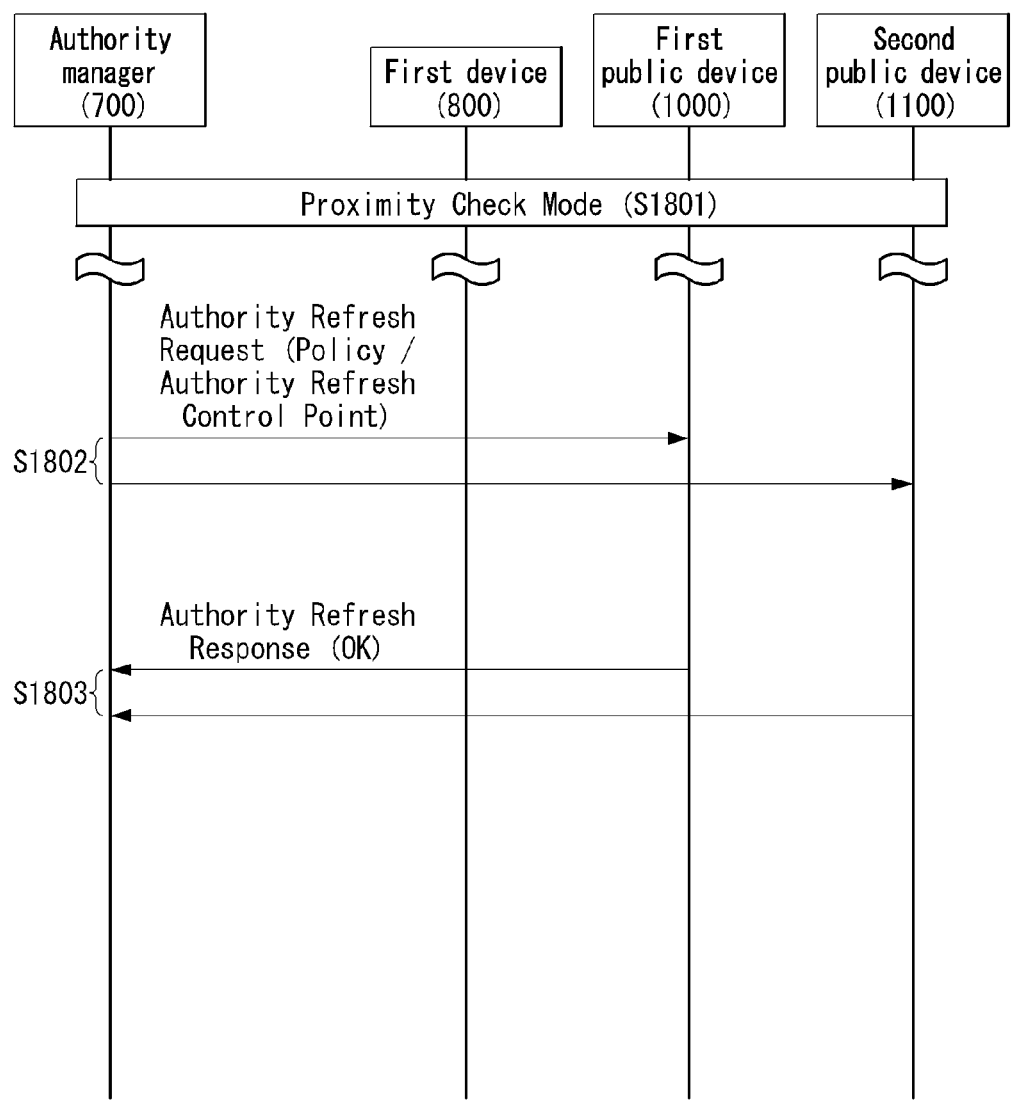

FIGS. 17 and 18 are flowcharts illustrating an example of a method for changing or discarding the authorization information of a device proposed in the present disclosure.

The devices that enter the Proximity check Mode check the proximity of a counterpart device using various methods such as a proximity profile, and so on (steps, S1701 and S1801).

When the first device 800, the first public device 1000 or the second public device 1100 gets out of the range defined by the Authority Manager 700, the Authority Manager 700 performs the authority refresh procedure.

The authority refresh procedure represents the procedure for withdrawing or discarding the given authorization.

In order to perform the authority refresh, the Authority Manager 700 transmits an Authority Refresh Request Message to the first device 800 (step, S1702), or transmits an Authority Refresh Request Message to the first and second public devices 1000 and 1100 (step, S1802), The Authority Refresh Request/Response message is referred to as the message for requesting to change or discard the authority policy of a device.

The first device 800 that receives the Authority Refresh Request Message transmits an Authority Refresh Response Message to the Authority Manager 700 (step, S1703).

And, the first and second public devices 1000 and 1100 that receive the Authority Refresh Request Message transmit an Authority Refresh Response Message to the Authority Manager 700 (step, S1803).

In other words, the Authority Manager 700 may directly discard or adjust the policy or authority by sending the Authority Refresh Request Message to the first device 800, or may change or discard the polity or authority information for the first device 800 by sending the Authority Refresh Request Message to the first public device 1000 and/or the second public device 1100 registered in the Authority Manager 700.

That is, in order for the first and second devices 800 and 900 to control the first and second public devices 1000 and 1100, all devices should be adjacent to the Authority Manager 700.

Figure 19:
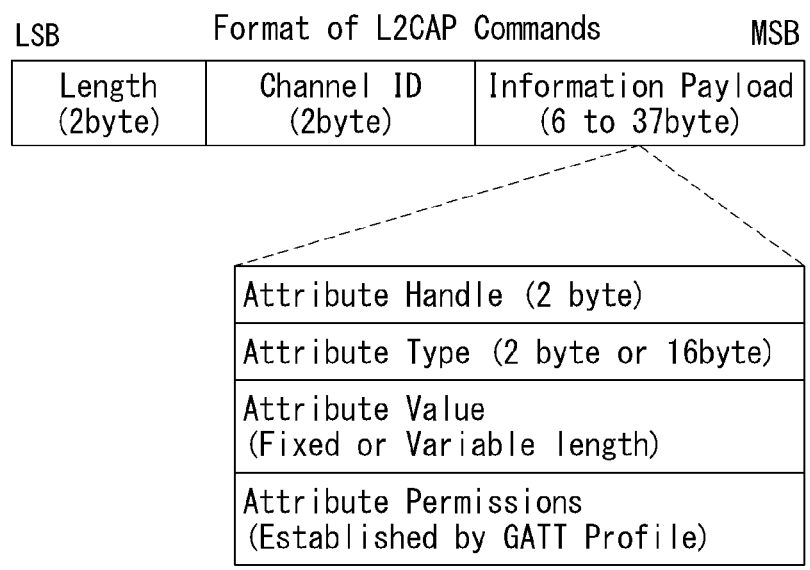
FIG. 19 is a view illustrating an example of data transmitted to change or discard the authorization information of a device according to an embodiment of the present invention.

FIG. 19 is a view illustrating an example of data transmitted to change or discard the authorization information of a device according to an embodiment of the present invention.

Referring to FIG. 19, the format of Authority Refresh Request and Response may have the form as the same as the Data Channel PDU Message.

The policy transmitted through the Authority Refresh Message and/or the Authority Refresh Control Point value may be included in an Information payload Field.

Here, the Policy/Authority Information represents the value that stores the device authority of a user. For example, the whole authority may be given to the device of user A, but only the authority for reading and executing may be given to the device of user B. And, the Policy/Authority Refresh Control Point represents the characteristics used for commanding to discard the policy and authority.

By setting the channel ID of the Data Channel PDU Message to be 0x0004, it may be represented that a message is going to be exchanged using an attribute protocol by configuring the format of Information Payload field in the attribute structure.

The Policy and/or Authority Refresh Control Point may be represented by being included in the attribute value. The attribute type may represent which meaning of a value is included by the attribute value.

Figure 20:
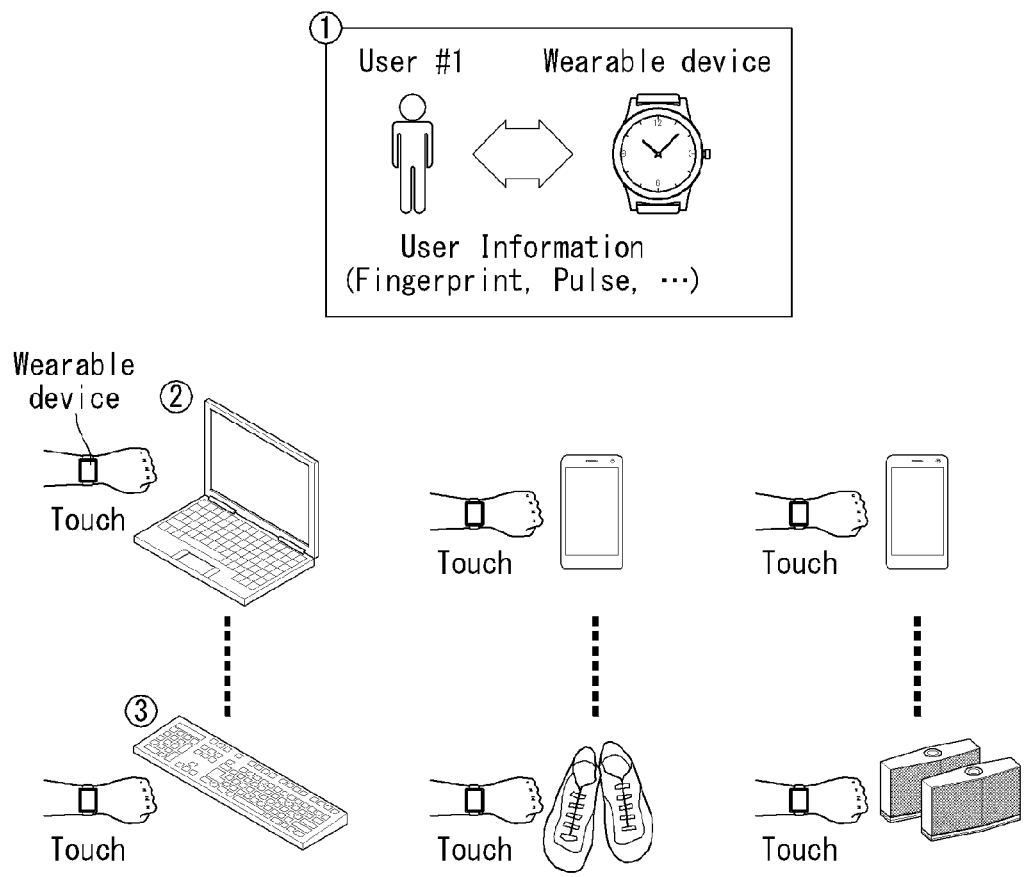
FIG. 20 is a view illustrating a method for connecting a device by acquiring the proximity information of a device proposed in the present disclosure.

FIG. 20 is a view illustrating a method for connecting a device by acquiring the proximity information of a device proposed in the present disclosure.

By reference to FIG. 20, an example to which the method described in the first embodiment above is applicable will be described.

1. A first user (User #1) wears a watch 500-1 which is the control device 500. The watch 500-1, a bracelet 500-2, and the like may be used for the control device 500, for example.

The watch 500-1 detects a user and stores (or registers) the user information for a first user.

As described above, the user information may be registered in the watch 500-1 using fingerprint, pulse, password, or the like.

2. The first user moves the watch 500-1 close to a notebook PC 300-1. In this case, the First Proximity Authentication is performed between the watch 500-1 and the notebook PC 300-1, and the watch 500-1 waits for another device being near the watch 500-1.

3. The first user moves the watch 500-1 near a keyboard 400-1. In this case, the Second Proximity Authentication is performed between the watch 500-1 and the keyboard 400-1.

The wireless connection is performed between the notebook PC 300-1 and the keyboard 400-1 that are authenticated for the proximity by the watch 500-1. Through this procedure, the first user is able to control the notebook PC by the keyboard.

In the same method described above, a user may connect or control between a cellular phone 300-2 and running shoes 400-2, between a mobile phone 300-2 and a Bluetooth speaker 400-3, and so on, using the control device 500.

Figure 21:
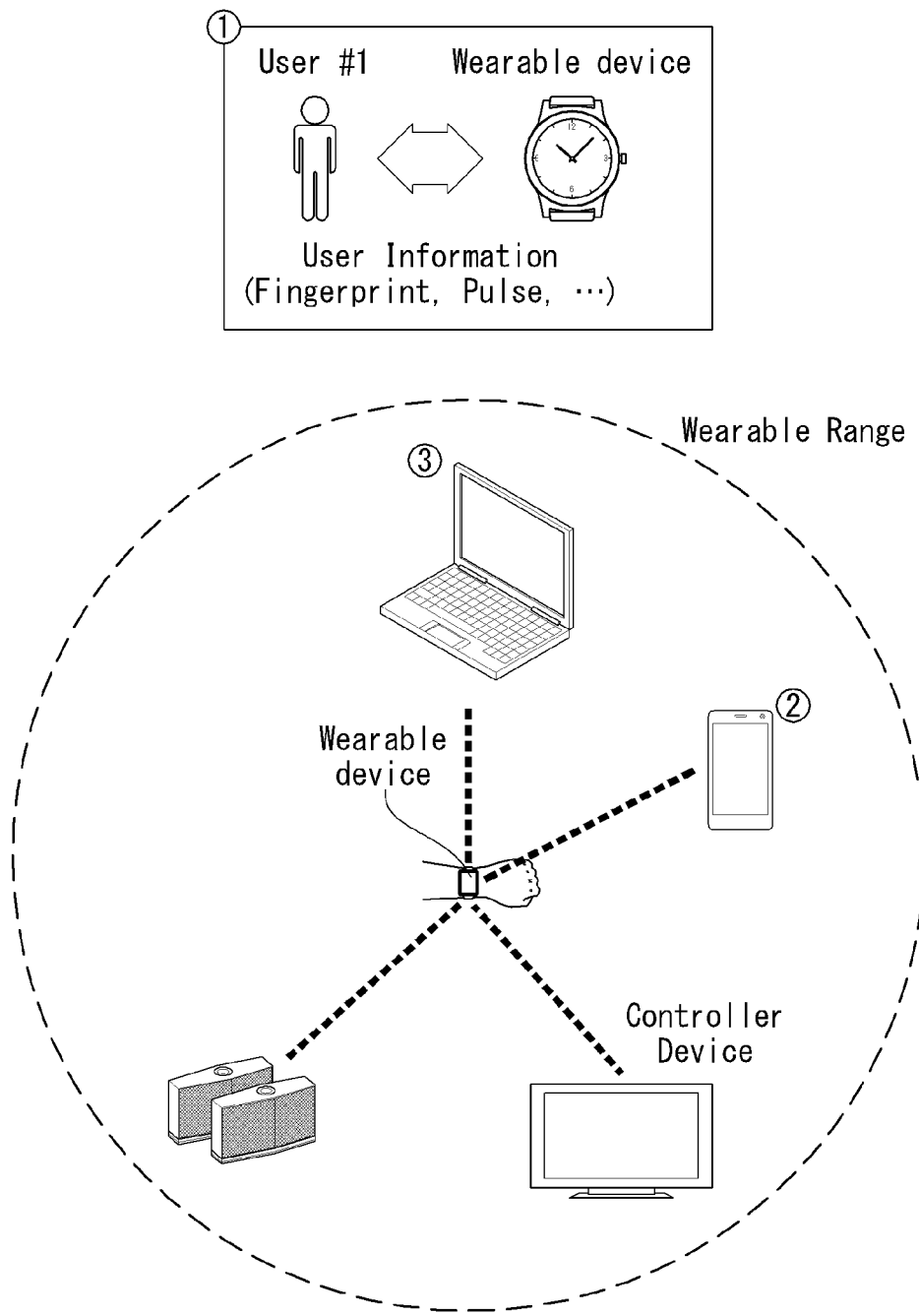
FIG. 21 is a view illustrating a method for controlling a device by checking the authorization information of a device proposed in the present disclosure.

FIG. 21 is a view illustrating a method for controlling a device by checking the authorization information of a device proposed in the present disclosure.

By reference to FIG. 21, an example to which the method described in the second embodiment above is applicable will be described.

1. A first user (User #1) wears a watch 500-1 which is the control device 500. The watch 500-1, a bracelet 500-2, and the like may be used for the control device 500, for example.

The watch 500-1 detects a user and stores (or registers) the user information for a first user.

As described above, the user information may be registered in the watch 500-1 using fingerprint, pulse, password, or the like.

2. The watch 500-1 performs the proximity authorization procedure with the devices within the wearable range which is the proximity range configured in the watch 500-1. And, the first user send a command to control a notebook PC 300-1 which is the first device 300 using a mobile phone 600-1 which is the second control device 600 that is authorized to access by the watch 500-1.

3. The notebook PC 300-1 recognizes (or check) that the mobile phone 600-1 is the first user's by performing the proximity authorization procedure with the watch 500-1, and performs the control command of the mobile phone 600-1 when it corresponds to the authority of the first user.

In the same method described above, a user may control the notebook PC 300-1, a TV 300-2, a Bluetooth speaker 300-3, and so on within the wearable range using the second control device 600.

Figure 22:
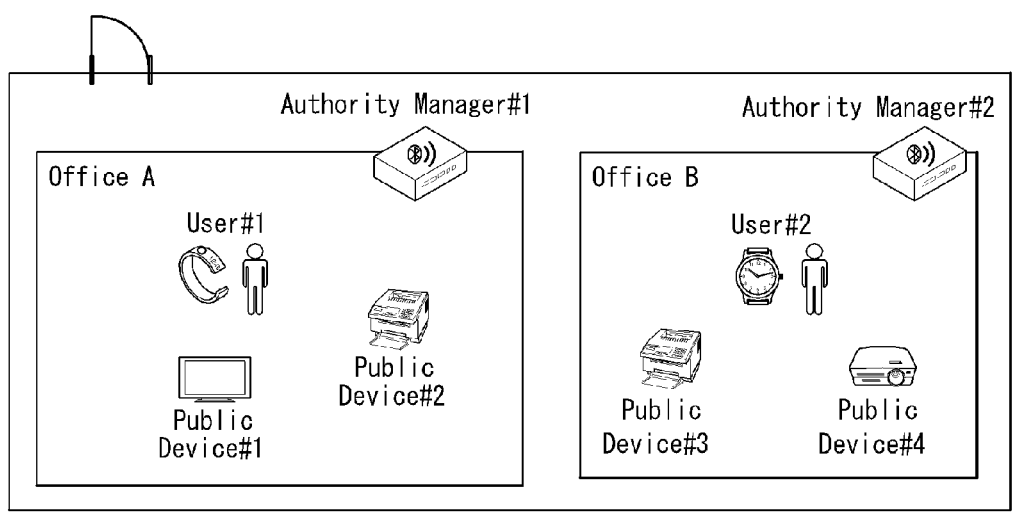
FIG. 22 is a view illustrating a method for controlling a device by checking authorization information of a device proposed in the present disclosure.

FIG. 22 is a view illustrating a method for controlling a device by checking authorization information of a device proposed in the present disclosure.

By reference to FIG. 22, an example to which the method described in the third embodiment above is applicable will be described.

1. A first user (User #1) enters office A with wearing a bracelet 800-2 which is the first device 800. The first Authority Manager 700-1 recognizes the first device 800 of the first user and secures the information of the first user through the Authority Information Exchange procedure.

Otherwise, the first device 800 recognizes the first Authority Manager 700-1 first, and requests the Authority Information Exchange procedure.

As described above, the rigorous check of user information such as the authority for a personal user device may not be required for the control authority for the public device. In this case, the Authorization Confirm procedure may be performed using a value of a different form from the key or token value that is generated through the direct user information exchange with user A. For example, the Authorization Confirm procedure may be performed by exchanging the token or key value for temporary user information.

2. The Authority Manager 700 forwards (or gives) the authority to control the first public device 1000 and the second public device 1100 that is registered through the register device procedure through the Authority Information Exchange procedure. The first user is able to control the first public device 1000 and the second public device 1100 through the bracelet 800-2 which is the first device 800.

3. When the first user gets out of the office A and gets out of the proximity range of the first Authority Manager 700-1, the first Authority Manager 700-1 discard or change the authority of the first user to control the first public device 1000 and the second public device 1100. This may be performed through the authority refresh procedure.

The method proposed in the present specification is described based on the Bluetooth LE, but may also be applied to the Bluetooth BR/EDR.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

The elements and the method described in the embodiments are not limitedly applied to the method proposed in the present disclosure, but the whole or a part of each of the embodiments may be selectively constructed so as to form various modifications.

Meanwhile, the method as proposed herein may be implemented as processor-readable codes in a recording medium that may be read by a processor provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

The preferred embodiment is shown and described so far in the present disclosure, but the present disclosure is not limited to the specific embodiment described above. It is apparent to an ordinary skilled person in the art that various modifications and changes may be made without departing from the spirit and scope of the present invention. Accordingly, the modifications and changes of the present invention should not be individually understood from the inventive concept or the prospect of the present invention.

And, both of the apparatus invention and the method invention are described in the present disclosure, and both of the invention may be complementarily applied on the occasion demands.

The present invention may have, but not limited to, following effects:

The present invention enables to easily establish a wireless connection between two devices using a device such as a wearable device using the Bluetooth technique and has an effect of increasing the user convenience.

In addition, according to a method for controlling a device using the Bluetooth technique according to an embodiment of the present invention, there is an effect of controlling the operation of another device through a control device.

In addition, the present invention has an effect of controlling peripheral devices without performing a specific procedure for acquiring control authority separately by registering user information in its own device.

In addition, the present invention has an effect of manipulate or control a device in a specific space conveniently by providing, withdrawing or changing a polity and an authority in the specific space.

In addition, the present invention has an effect of controlling a device without performing an authentication procedure individually as much as the number of devices when a user is going to connect and control a specific device with many devices.

The technical effects in the present invention are not limited to the above-described technical effects and other technical effects which are not described herein will become apparent to those skilled in the art from the following description.

What is claimed is:

1. A method for controlling a second device performed by a control device using a Bluetooth communication, the method comprising:
   establishing a Bluetooth connection with a first device;
   receiving, from the first device, a first token generated using first user information that indicates a first user of the first device;
   establishing a Bluetooth connection with a second device;
   exchanging the first token and, a second token stored in the second device with the second device,
   wherein the second token is generated using second user information that indicates a second user registered in the second device;
   transmitting a control message instructing a specific operation to the second device when the user identified by the first token and the user identified by the second token match,
   wherein a range of control authorization for the second device is determined based on a value of the first token,
   wherein a distance between the first device and the second device is periodically calculated by the first device,
   wherein the distance between the first device and the second device is calculated using Received Signal Strength Indication (RSSI), and
   wherein the control authorization for the second device is released when the distance between the first device and the second device is less than a first threshold value.

2. The method of claim 1,
   wherein the first token is transmitted from the first device when a first distance value that indicates a distance between the first device and the control device is smaller than a second threshold value preconfigured in the first device, and
   wherein the second threshold value is a value for determining a proximity with the first device.

3. A control device for controlling a second device using a Bluetooth communication, the control device comprising:
   a communication unit for communicating to an external device; and
   a processor functionally connected to the communication unit,
   wherein the processor is configured to:
     establish a Bluetooth connection with a first device;
     receive, from the first device, a first token generated using first user information that indicates a first user of the first device;
     establish a Bluetooth connection with a second device;
     exchange the first token and, a second token stored in the second device with the second device,
     wherein the second token is generated using second user information that indicates a second user registered in the second device; and
     transmit a control message instructing a specific operation to the second device when the user identified by the first token and the user identified by the second token match,
     wherein a range of control authorization for the second device is determined based on a value of the first token,
     wherein a distance between the first device and the second device is periodically calculated by the first device,
     wherein the distance between the first device and the second device is calculated using Received Signal Strength Indication (RSSI), and
     wherein the control authorization for the second device is released when the distance between the first device and the second device is less than a first threshold value.

4. The control device of claim 3,
   wherein the first token is transmitted from the first device when a first distance value that indicates a distance between the first device and the control device is smaller than a second threshold value preconfigured in the first device, and
   wherein the second threshold value is a value for determining a proximity with the first device.

* * * * *